United States Patent [19]

Jacobson

[11] Patent Number: 4,591,858
[45] Date of Patent: May 27, 1986

[54] BEACON/RADAR VIDEO GENERATOR SYSTEM FOR AIR TRAFFIC SIMULATION

[75] Inventor: Stephen R. Jacobson, Arlington, Va.

[73] Assignee: The Mitre Corporation, Bedford, Mass.

[21] Appl. No.: 446,852

[22] Filed: Dec. 3, 1982

[51] Int. Cl.[4] .................................................. G01S 7/40
[52] U.S. Cl. ........................................ 343/17.7; 434/2
[58] Field of Search ................... 343/17.7, 456; 434/2, 434/3, 5

[56] References Cited

U.S. PATENT DOCUMENTS

| | | | |
|---|---|---|---|
| 3,374,481 | 3/1968 | Lupinetti | 343/17.7 |
| 3,571,479 | 3/1971 | Horattas et al. | 434/2 |
| 3,783,172 | 1/1974 | Bernstein | 434/2 |

Primary Examiner—Theodore M. Blum
Attorney, Agent, or Firm—Kenway & Jenney

[57] ABSTRACT

Preprogrammed aircraft target information is stored in separate lists of beacon and radar target words each including azimuth, range and amplitude data for a designated target within the current one of a plurality of predetermined azimuth "half" sectors. For each radar target word whose starting and ending azimuth includes the current azimuth, its amplitude data is loaded into the range bin of one of a first pair of high speed RAM data stacks addressed by the range data of the target word. When the radar trigger occurs, the previously loaded data stack is read out sequentially bin-by-bin. An echo pulse is formed by a video data output control for each range bin containing a non-zero value. For a beacon target of valid azimuth, the amplitude data is loaded into the range bin of one of a second pair of data stacks addressed by the range data of the beacon target word. The same amplitude data is loaded into every eighth range bin for which the corresponding bit of the transponder 3/A or C code is a "1". The previously loaded stack beacon data is read out sequentially at a slightly faster rate for beacon targets than for radar targets to simulate the standard ATCRBS interpulse period. The data stacks for either beacon or radar targets are alternated so that one is available for loading while the other one is being read out.

19 Claims, 26 Drawing Figures

BLOCK DIAGRAM OF A
VIDEO GENERATOR CHANNEL

BLOCK DIAGRAM OF A
VIDEO GENERATOR CHANNEL

RADAR TARGET WORDS

| WORD | BYTE | | | |
|---|---|---|---|---|
| 0 | 0 | 0 | n | STARTING AZIMUTH (12 BITS) (ACPs) |
| 1 | 2 | 0 | n | ENDING AZIMUTH (ACPs) |
| 2 | 4 | n | | AMPLITUDE (8 BITS) |
| 3 | 6 | STACK WORD ADDRESS (14 BITS) (1/64 nmi - SR) | | |

BEACON TARGET WORDS

| WORD | BYTE | | | |
|---|---|---|---|---|
| 0 | 0 | 0 | n | STARTING AZIMUTH (ACPs) |
| 1 | 2 | 0 | n | ENDING AZIMUTH (ACPs) |
| 2 | 4 | n | | AMPLITUDE (8 BITS) |
| 3 | 6 | STACK WORD ADDRESS (14 BITS) (.01466 nmi or 1/68.2) | | |
| 4 | 8 | 3/A CODE (16 BITS)<br>SPI X n n $A_4$ $A_2$ $A_1$ $B_4$ $B_2$ $B_1$ $C_4$ $C_2$ $C_1$ $D_4$ $D_2$ $D_1$ | | |
| 5 | 10 | NO ALT. | C CODE (ALTITUDE)<br>n n n n $D_2$ $D_1$ $A_4$ $A_2$ $A_1$ $B_4$ $B_2$ $B_1$ $C_4$ $C_2$ $C_1$ | |

NO ALT. = 0 — DON'T REPLY WITH MODE C
 = 1 — REPLY WITH MODE C

END OF LIST

| 0 | 0 | 1 | n |
|---|---|---|---| n = NOT USED

FIG. 3

RADAR AND BEACON
VIDEO CONTROL WORDS

EXAMPLE OF VIDEO DATA REGISTER STACK ADDRESSING WITH A 16384 WORD STACK AND STACK WORD TIMING OF .193 MS.

ILLUSTRATION OF THE
DUAL STACK OPERATION

ILLUSTRATION OF A VIDEO DATA
REGISTER STACK MEMORY CYCLE

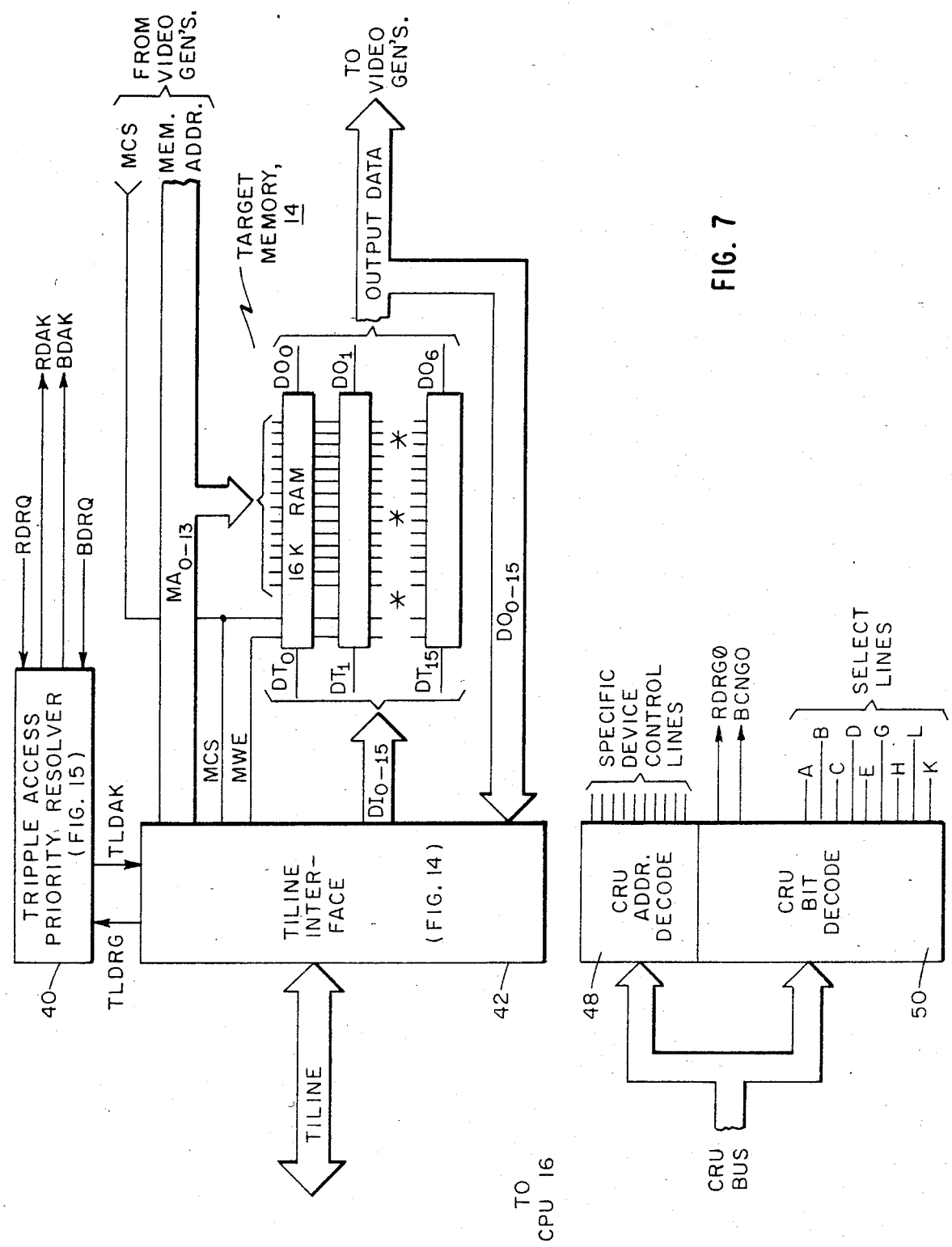

MEMORY MAP

RADAR TARGET RETRIEVAL SYSTEM

BEACON TARGET RETRIEVAL SYSTEM

FIG. 16    R ADDRESS SEQ.

BEACON/RADAR VIDEO GENERATOR SYSTEM FOR AIR TRAFFIC SIMULATION

BACKGROUND OF THE INVENTION

Airport and en route air traffic control from ground installations relies upon the accuracy, resolution, and capacity of air traffic control systems. Typical air traffic control systems receive complex video data from rotating radar antennas and beacon interrogator sets. The signals from the surveillance system comprise radar echo signals as well as pulse trains from airborne transponders interrogated by the scanning ground beacon. A target extractor receives both sets of information as video data and converts these data into digital format for acceptance by a digital computer complex. The digital data include aircraft range (derived from radar echoes), azimuth (derived from the antenna position), and altitude, identity code (C or 3/A) and control flags (derived from the beacon transponder signal). The digital computer complex in turn processes and transmits data to the controller displays in the form of aircraft position signals. On each rotational scan of the radar/beacon set, hundreds of aircraft targets, some with overlapping transponder responses may be uncovered along with the usual clutter and random noise. This highly complex signal requires equally complex electronic circuitry. As critical decisions are made in reliance on the information displayed based on the video signals received from the actual targets, the air traffic control system must be tested regularly to insure its reliability.

Radar and beacon target report inputs, however, are not easily fabricated. The standard practice has been to use live radar targets (targets of opportunity), videotaped live radar targets (for repetitive testing), simulated static (not moving) radar and beacon targets, digital simulators capable of simulating the output of the radar preprocessor, such as the airport radial track system IIIA (ARTS IIIA) digital target simulator, and simulated inputs from the system's training target generator.

These past methods of providing radar and beacon targets have a number of disadvantages which can result in a defective or substandard air traffic control system receiving a passing grade. Live radar targets cannot be controlled; they are rarely found in large enough quantities to provide heavy system loading, and their tracks cannot be repeated.

While videotaping live targets affords repetition, the targets lack controllability and the taping process itself introduces serious degradation of the radar returns. Simulated static targets are only sufficient for testing the radar preprocessor; they do not allow the surveillance tracking system to be tested. On the other hand, digital target simulators, although able to test the tracking and display functions of the surveillance system, effectively bypass the radar preprocessor thus neglecting an important part of the system. Finally, the use of the training target generator bypasses the entire radar preprocessor and its associated input functions on the main processor. In addition, since the training target generator software operates in conjunction with the surveillance software and therefore interacts with the entire system, the training software's effect on the total system is not always readily detectable.

The foregoing techniques although they have many shortcomings, have been developed precisely because there has never been a suitable radar/beacon video traffice generator. The most critical functions of any air traffic control system involve the handling of closely spaced aircraft. Representing the video signals associated with with several moving intersecting clusters of dense air traffic requires electronic circuitry which has eluded the art up until now. Yet, this would be the ideal way of testing air traffic control systems at their "Achilles' heel" where mistakes are not only far more likely to occur but are also far more likely to have serious consequences.

SUMMARY OF THE INVENTION

Accordingly, the general purpose of the invention is to fabricate radar/beacon video signals from controllable scenarios of dense, moving air traffic fast enough and with enough capacity and accuracy to simulate heavy system loadings up to and far beyond those which would be encountered by any air traffic control system today. A corrolary object of the invention is to make the radar/beacon video generator system flexible enough to accommodate a variety of pulse repetition frequencies, radar scan rates, beacon interrogation modes and general characteristics of radars and beacons commonly encountered in any of the world's airports and en route control systems.

These and other objects of the invention are achieved by a novel air traffic video simulator employing high speed electronic logic and memory circuitry for retrieving stored digital target data for both beacon and radar returns and simultaneously creating video output signals for each radar sweep at a given azimuth. A target storage register is used to store separate lists of radar and beacon target words each including starting and ending azimuth, range and amplitude data within the current one of a plurality of azimuth half-sectors (5.6°). The target storage register is searched for target words whose starting and ending azimuth includes the current azimuth of the imaginary or real antenna. For each such word, the amplitude data is loaded into the range bin of one of a first pair of high speed data stacks addressed by the range data of the target word. Each data stack in the preferred embodiment is composed of 16,384 8-bit range bins corresponding to 95 foot increments provided by eight 16K static random access memories (RAM). When the radar range zero trigger occurs, the contents of the previously loaded stack register are read out and cleared bin-by-bin in sequence according to their progressively increasing designated ranges at a clock rate related to the radar timing and the range interval between the range bins. If the range bin contains a non zero value, an echo pulse is formed by the video data output control which corresponds to the simulated aircraft target. This echo is mixed with random noise and sent to the output video drivers.

One pair of data stack registers is dedicated to radar targets and a separate pair is dedicated to beacon targets. One register in each pair is loaded while the other register in each pair is read out and cleared to achieve an alternating operation of the registers within each pair.

Beacon targets are separately stored and searched within the main target storage register. In addition to the radar target information, a beacon target must indicate the identification code and altitude. Each of these codes is a string of zeroes and ones which forms a binary pulse train. When the beacon target search system finds a beacon target whose starting and ending azimuth include the azimuth of the beacon, the amplitude for the beacon target word is loaded into a first range bin in the available beacon data stack register addressed by the range data of the target word. The same amplitude data is then entered in every eighth range bin for which the corresponding bit of the transponder data word is a "1". At the next trigger the loaded beacon data stack is read out and cleared bin-by-bin at a rate which causes every 8th range bin to appear on the output line at an interval corresponding to the international standard ATCRBS for pulse-to-pulse interval.

In another aspect of the invention, the target storage register is loaded with target words for the next adjacent sector, while the current half sector is being searched and read out. Memory access conflict resolver circuitry shares access to the target storage memory between a central processing unit (CPU) responsible for loading the target storage register and the beacon and search radar video generator circuitry, which have priority over the CPU.

BRIEF DESCRIPTION OF THE DRAWING

FIG. 3 is a schematic representation of the target word formats.

FIG. 7 is a block diagram illustrating the data and control bus interfaces and target list memory access system.

Figure 17:
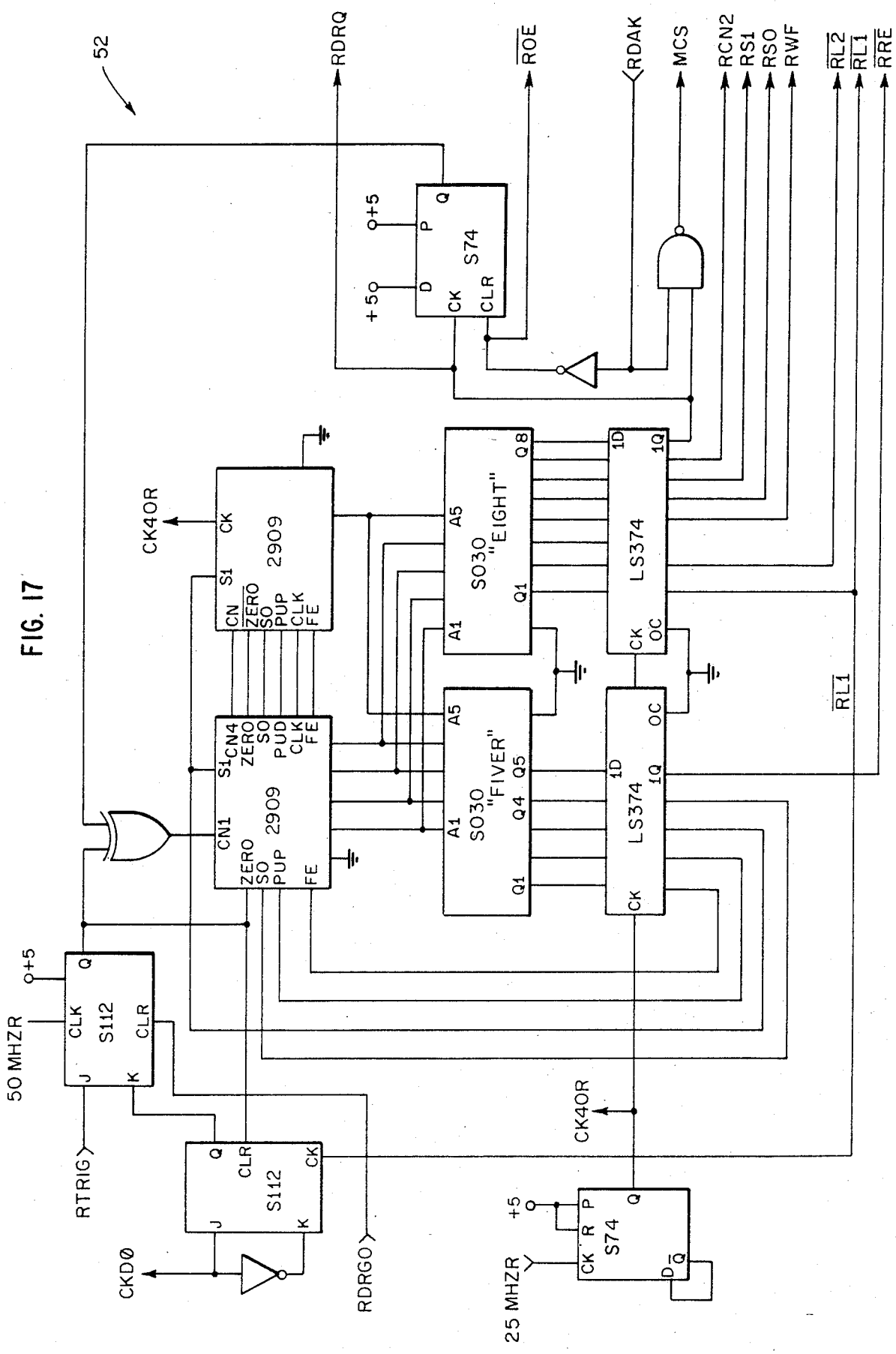
FIG. 17 is a schematic diagram of the radar CPU sequencer.
Figure 20:
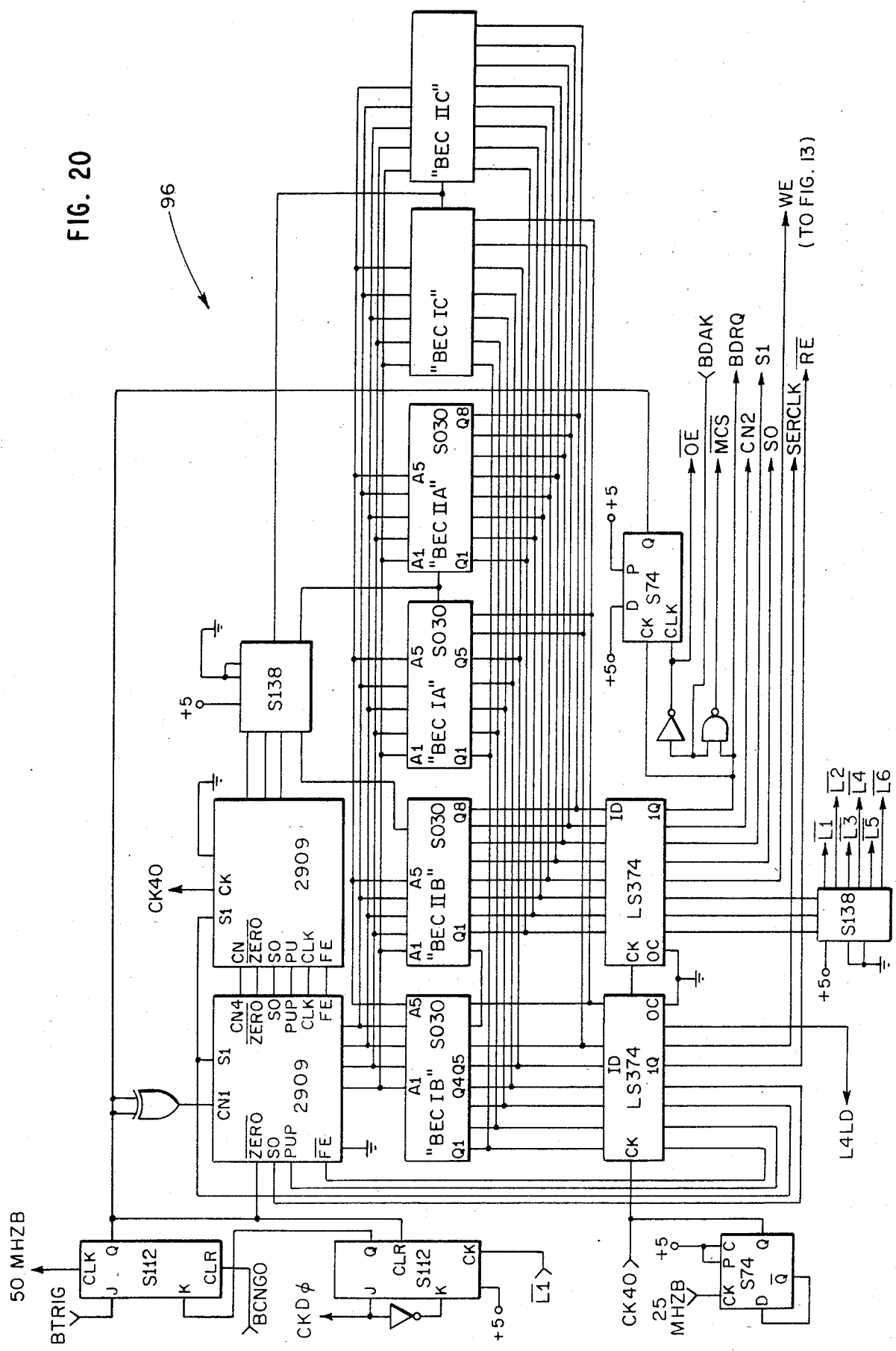
FIG. 20 is a schematic diagram of the beacon CPU seqüencer.
Figure 21:
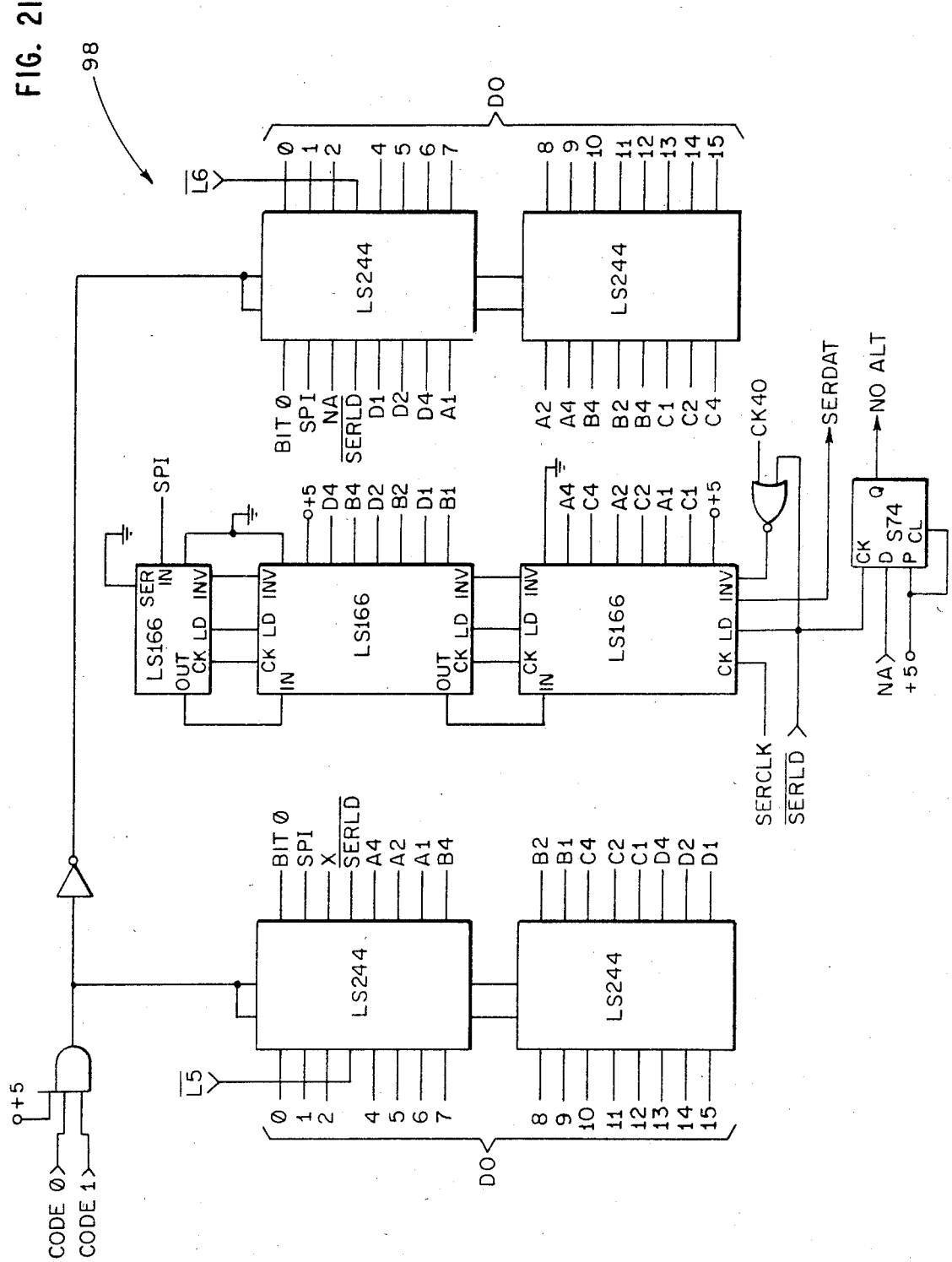
FIG. 21 is a schematic diagram of the beacon transponder mode count-by-eight circuit.
Figure 22:
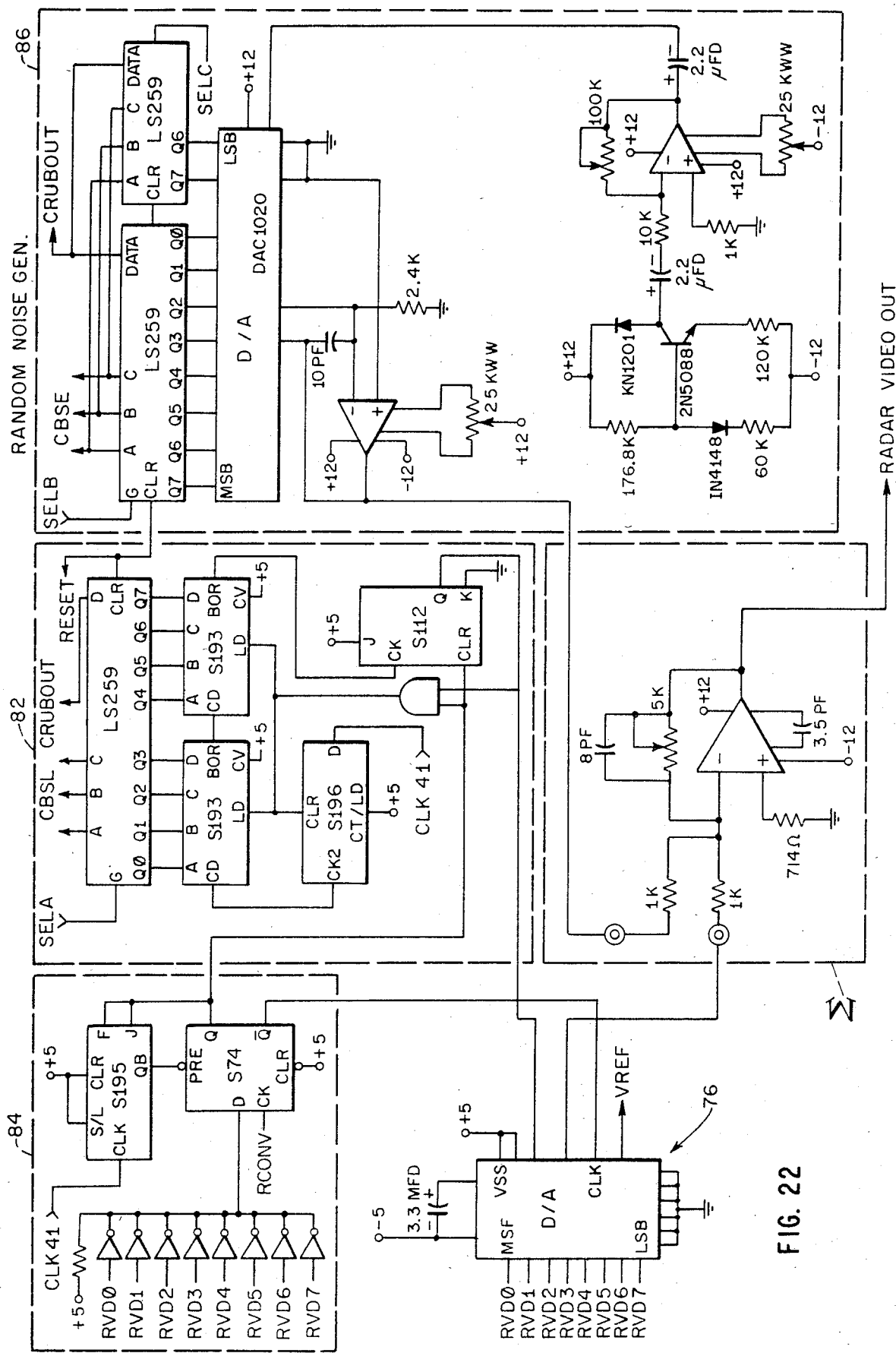
FIG. 22 is a schematic diagram of the output video circuitry.
Figure 23:
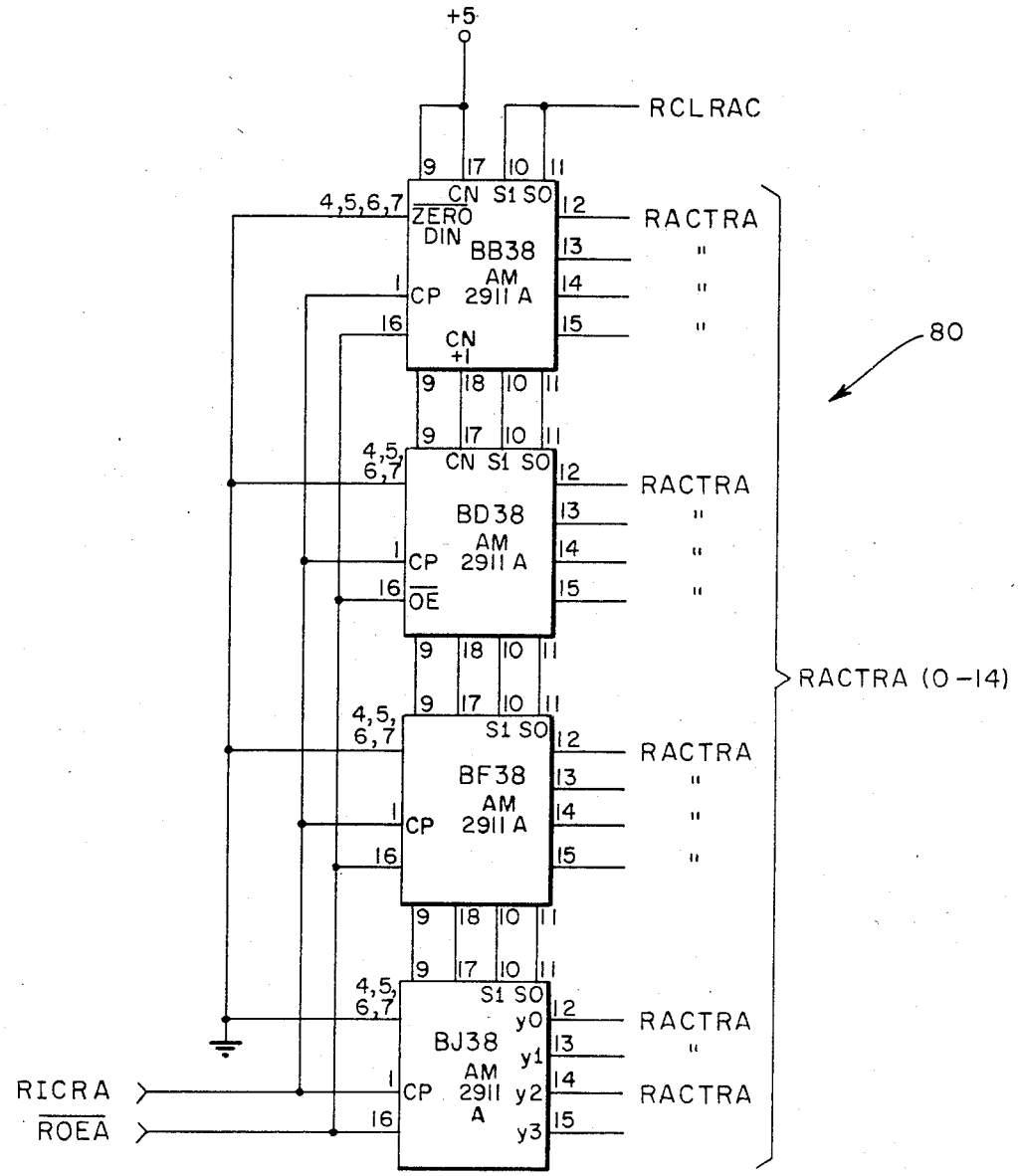
FIG. 23 is a schematic diagram of the readout address sequencer for data stack A.

Appendices I–VIII, inclusive are computer printouts which represent in hexadecimal code the contents of the respective read only memory (ROM) chips ("SO30") in FIGS. 17 and 20.

DESCRIPTION OF THE PREFERRED EMBODIMENT

The preferred design employs a high speed hardware driven random access memory array which automatically clocks out appropriate target data transferred from a main target storage memory at precisely controlled rates to simulate the actual radar and beacon interrogator set return signals that serve as the input to the target extractor of a conventional air traffic control system. The system has the capacity for providing live-appearing search radar and beacon return signals for 1200 moving targets based on ASR type radars. For ARSR radars the capacity would be considerably greater. The PRF scan rate range clocks and pulsewidths are all adjustable in order to simulate a range of different radars and beacon equipment. The system permits a range resolution of 95 feet for search radar and 90 feet for the beacon system that interfaces with airborne transponders. By judicious use of multiplexed high speed memories, logic and embedded processors, the electronic circuitry is even designed to be portable.

Figure 1:
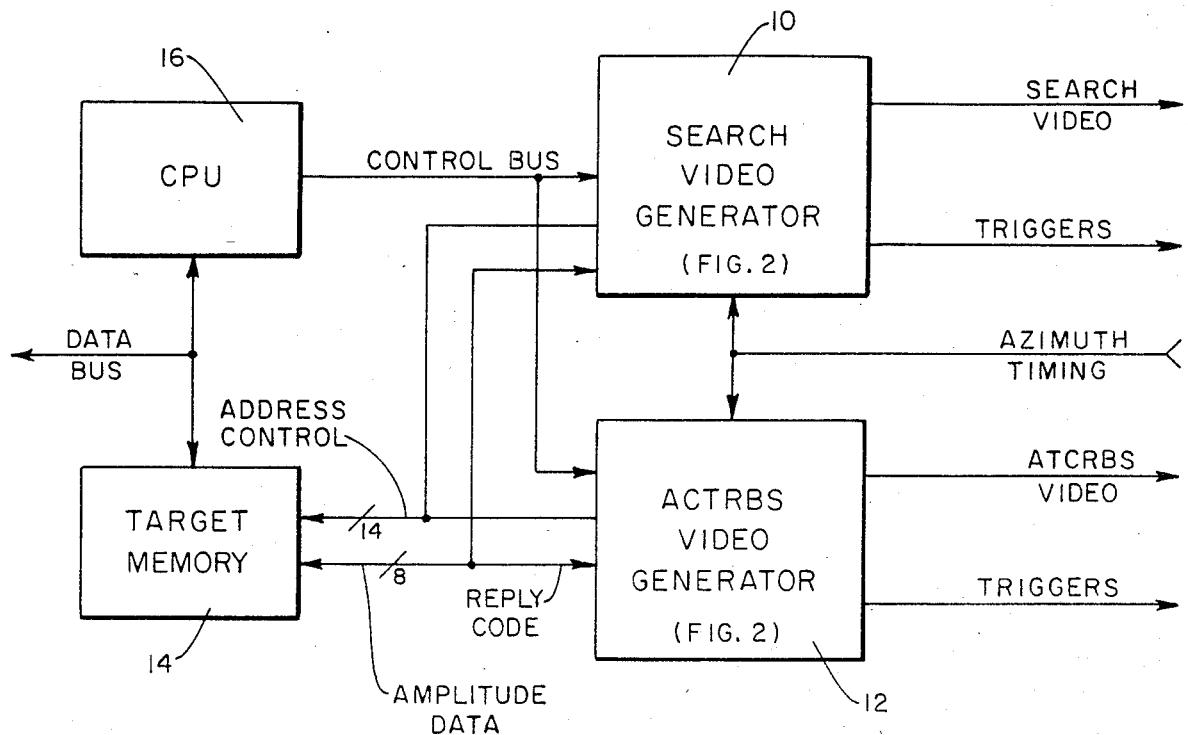
FIG. 1 is an overall block diagram of the beacon/radar video generator system according to the invention.

As shown in FIG. 1, the video generator system is organized in two separate channels for simulation of search radar video and air traffic control radar beacon system (ATCRBS) video, respectively. Search radars utilized echo ranging principles for their operation. The radar transmits a narrow beam high energy pulse into space, initiates a timing sequence and waits for a return echo. If a target is in the path of the beam, the received echo consists of a pulse of energy approximately the width of the transmitted pulse. The time relationship of the transmitted pulse to the received echo is proportional to the distance of the target from the radar. The search video generator of FIG. 1 accurately simulates these return echoes in their correct time relationship and their correct strength as indicated for various targets. As the radar antenna rotates or "scans", the transmitter transmits thousands of radar pulses each at a slightly different orientation or "azimuth". The pulse repetition frequency and azimuth rate together with the length and speed of the aircraft target as seen from the radar, determine the number of "hits" which will be scored on a given target in one scan of the radar antenna.

The ATCRBS video is different from the radar video. The ground interrogator or "beacon" transmits a series of pulses to an airborne transponder. The transponder replies to the interrogation with a pulse drain, representing either the altitude of the aircraft or a preset identity code. The choice of the reply is determined by the interrogation mode. The beacon is also a rotating antenna with pulse repetition frequency and continuously changing azimuth. In addition, the mode of interrogation is preprogrammed so that it alternates in a predetermined pattern with each interrogation.

The reply pulse train from the aircraft is characterized by a predetermined sequence of bit periods of standard duration. Binary code is produced by keying the transmitter on briefly during the bit period if the corresponding bits is a "1" and not keying the transmitter on during the corresponding bit period if the bit is a "zero". Thus the arriving pulse train is a series of similar amplitude pulses that are spaced by the interpulse period between two "1's" or by one or more missing pulses. By noting the arrival time of the first pulse, the reply also provides range information. Thus, for a single interrogation at a given azimuth intersecting close and distant aircraft, the close aircraft's beacon reply will be received before the distant aircraft's reply. Because of the timing of the interpulse periods, if the aircraft are close enough together, their arriving reply pulse trains can overlap in which case the video output from the beacon (in the receiver mode) will be a compound version of both pulse trains. The ATCRBS video generator 12 of FIG. 1 can simulate reply pulse trains of different amplitudes, even overlapping replies, in response to the appropriate interrogation modes programmed for various targets.

The video generators 10 and 12 are designed to produce video in accordance with target information stored in a high speed random access target memory 14. This memory which will be described below stores lists of target words which define the target parameters necessary to simulate the return signals, including azimuth, range, amplitude, identity codes and altitude code, the latter two parameters having to do only with ATCRBS. The targets are listed separately as search radar targets and beacon targets. The data defining these targets is entered into the high speed memory 14 by means of a programmed computer 16, preferably a Texas Instruments 990/5 CPU utilizing an asynchronous data bus (TILINE) and control bus (CRU) for external I/O devices. Because at least some of the targets are moving, the target data must be updated for each rotational scan of the radar beacon set.

The description of the motion and identity of the various targets whose return signals are to be simulated entails defining an air traffic scenario. The scenario composition portion of the overall beacon radar air traffic simulator system does not form a part of the present application because the video generator portion represents a separate and distinct entity. The target memory 14 is interrogated and whatever data is present is retrieved and processed by the generators 10 and 12 regardless of how the data was composed and entered. The scenario composition system can be implemented by a separate programmed computer system (not shown), the "control processor", which can be tied to the output processor 16 as part of a multiprocessor system. The control processor is used to establish the target scenarios and given parameters such as pulse repetition frequency, radar scan rate, blip scan ratio, round reliability, distance, angle, standard deviation of azimuth jitter and other such parameters necessary to simulate beacon/radar equipment performance. The timing signals necessary to synchronize the video with the simulated radar or interrogation pulse is conveyed to the generators 10 and 12. The target scenario data is retrieved by means of the output processor 16 and this target information is used to compose target data introduced into the memory 14. This data is then searched by the radar and ATCRBS generators 10 and 12 for radar and beacon targets applicable to a given "sweep" (pulse transmission and receipt) and the data is converted to video signals.

Figure 2:
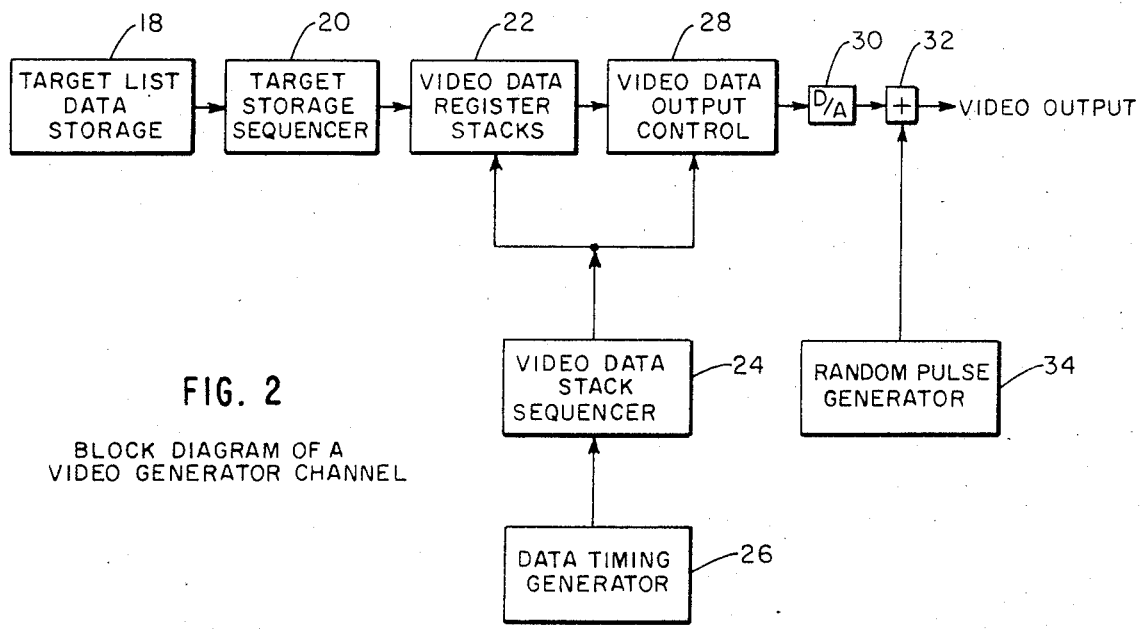
FIG. 2 is a functional block diagram applicable to either one of the two separate video generators.

A functional block diagram of the basic video generator channel layout for one channel is shown in FIG. 2. The actual system of FIG. 1 is composed of two such channels, one for search radar and one for ATCRBS which share the target memory 14 as shown in FIG. 1. These channels are completely separate but differ in the target storage sequencer and data timing generator. The basic principles, however, are identical. Preestablished aircraft target information for the current half sector (5.6°) is in target list data storage 18, composed of radar or beacon target lists which reside in specified areas of the random access target memory 14. The target storage sequencer 20 for a given channel retrieves all of the target data for the current half sector, examines it to determine if the current simulated antenna azimuth is within the bounds of the target. If so, the amplitude of the target is placed in code in the appropriate position in the video data register stacks 22. Each channel has two data register stacks which alternate. Each stack has eight 16K high speed RAM's. Thus, each stack has 16,384 addresses and at each address there are eight bits employed as a "range bin" which can be written into or read out. Each range bin represents a specific distance from the radar antenna ("target range"). When the radar range zero trigger occurs, the stack that was previously loaded has its range bins read out in sequence by the video data stack sequencer 24 based on timing signals provided by the data timing generator 26 for the corresponding channel. If the range bin contains a value other than zero, an echo pulse is formed by the video data output control 28 and digital to analog converter 30. The echo corresponding to a simulated aircraft target is mixed in summation circuit 32 with random noise from generator 34 and sent to the output video drivers associated with the air traffic control system's radar target extractor system (not shown).

FIG. 3 shows the format of the target words in the target list storage 18 of memory 14. For each radar target, four 16 bit words are used. The first two words, designated by zeros in the first bit position, represent the starting and ending azimuth. 12 bits are needed since the 360° scan is divided into 4,096 azimuth change pulses (ACP's). The starting and ending azimuth range represents the angle subtended by the target as seen from the radar antenna. The third word represents the strength of the return signals in terms of eight bits of amplitude data. Thus, the amplitude can be represented as any integer between zero and 255. The last word of a given radar target represents the target's range. Instead of giving the range in nautical miles, the range is given in terms of the 14 bit address of the range bin in the data stack which corresponds most closely (within 95 feet) to the target's range. Each four-word radar target is stored randomly in the target list data storage 18. All targets have exactly the same format so that when they are searched, if the starting and ending azimuth include the current simulated azimuth, the third word (amplitude) is inserted in the range bin indicated by the fourth word.

Beacon target words are more complicated. In addition to the four words representing starting and ending azimuth amplitude and range, each beacon target has two transponder reply code words. The so-called 3/A code requires 12 bits representing the identity of the aircraft according to FAA and international standards. The sixth word of each beacon target is the so-called C code which provides an encoded readout of the aircraft's altimeter in the form of a binary pulse train. The first bit of the altitude word designated "NO ALT." indicates whether the C code reply mode is available on that target. On a given interrogation, only the 3/A or the C code, if indicated, will be produced in reply, the mode of fnterrogation determining the mode of reply in each instance. Every beacon target is described in the same six word format and stored in the corresponding target list data storage 18 for beacon targets.

The four word radar targets and six word beacon targets do not have to be arranged in order of azimuth. They may be listed in any order since all of them are retrieved for examination by the corresponding target storage sequencer 20. The end of a list of radar words or a list of beacon words for a given half sector is signified by a dummy target whose first word begins with a "1" to signify the end of the list.

Figures 4, 4A:
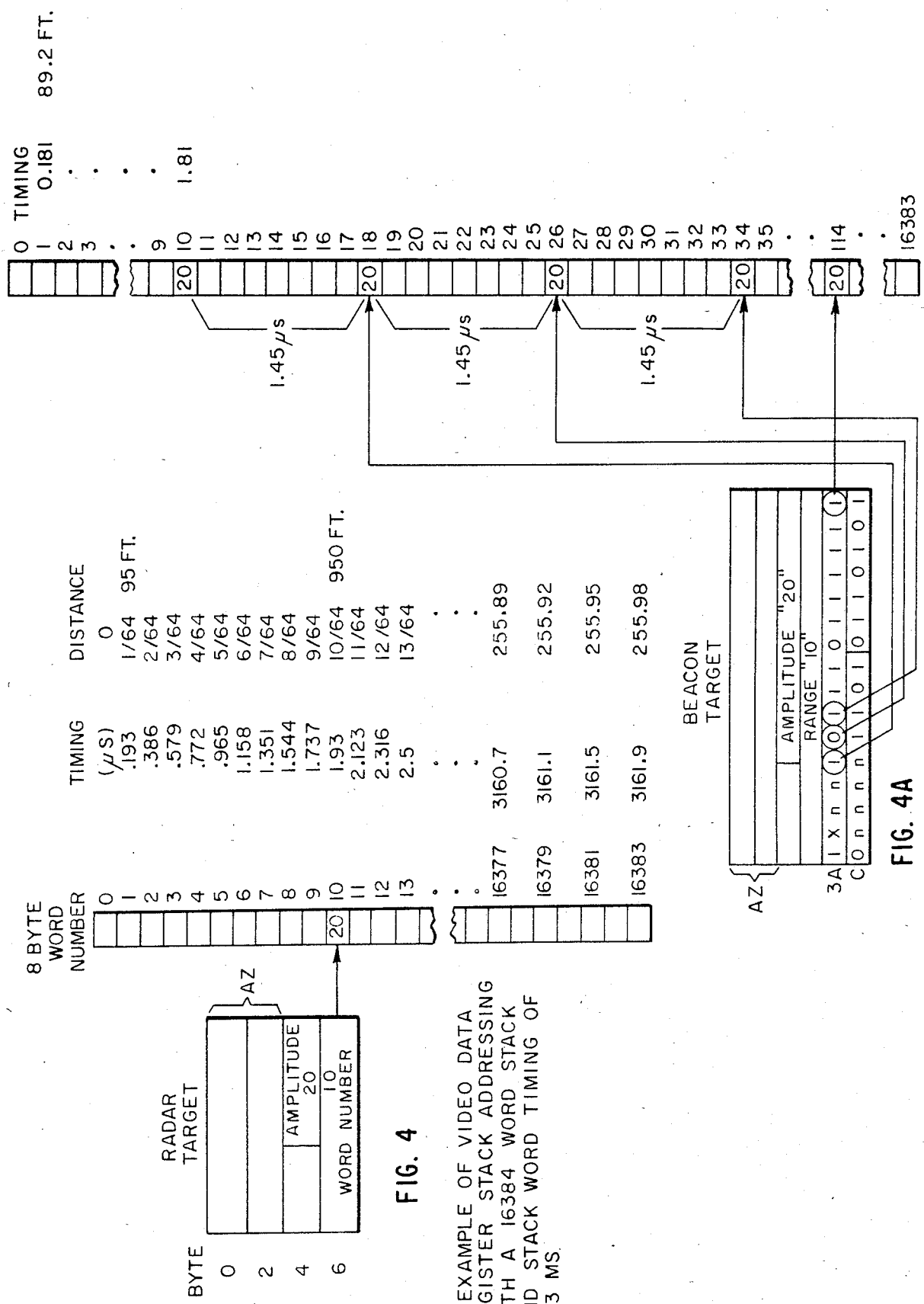
FIG. 4 is a schematic representation of a search radar data register stack.
FIG. 4A is a schematic representation of a beacon data register stack.

An illustration of the stack addressing is shown in FIG. 4. Here, the target storage sequencer 20 has come up with a radar target that has azimuth limits which include the current simulated azimuth. Whenever this occurs, the available radar data stack 22a is accessed. The fourth word in the target holds the key to one of the 16,383 range bins. The 14 bit address in the illustration represents the tenth range bin corresponding to a distance from the antenna of 10/64 of a nautical mile (950 feet). All eight of the 16K RAMS are similarly addressed and the corresponding amplitude bits are entered in parallel in the eight-bit addressed range bin. In the illustration, the amplitude is 20 out of a possible 256 different values. If there are no other targets in front of or behind the target at range bin 10, this will be the only range bin to be filled with target amplitude data.

Figure 5:
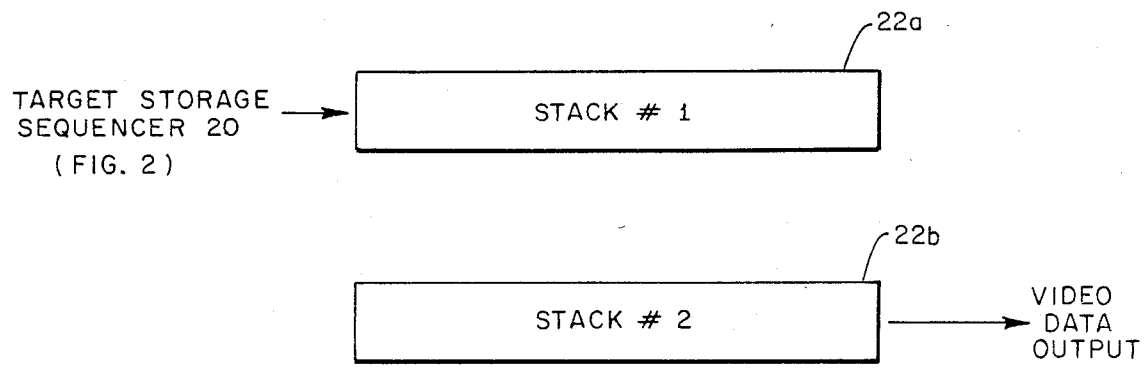
FIG. 5 is a schematic representation of the video generator dual data register stack operation.

The stacks for each channel (radar or beacon) are arranged in a dual stack configuration (FIG. 5). One stack 22a is fed by the target storage sequence 20, while the other stack is being sequentially read into the video data output control. When the next radar range zero trigger is received, the stacks are reversed and data is read from stack 1 while the sequencer writes into stack 2. This system relieves any timing constraints in updating the video stack.

When the next radar range zero trigger occurs the ready stack is read out by addressing it in the read mode with sequential addresses starting with range bin zero and ending with range bin No. 16,383 (or any other designated ending point short of 16,383). Note that this is not a shift register. The contents of the other range bins are unaffected when one range bin is addressed. The range bins are read out, each one in parallel, at a rate of 5.18 MHz such that a range bin is presented at the output every 0.193 microseconds (us). Each range bin thus represents a range or distance of 1/64 of a nautical mile.

Figure 6:
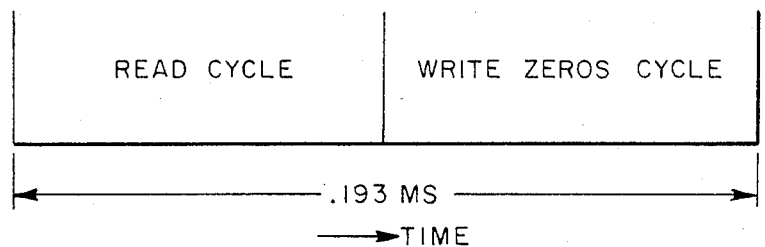
FIG. 6 is a timing diagram illustrating the radar data stack read/clear cycle.

Each time a range bin is ready by the video data output control 28, the same 8 bit word is automatically cleared to zeros as represented in FIG. 6. The sequential reading/zeroing of the register stack begins at the radar range trigger and ends at a predetermined stack word address. This ending address is preestablished as the maximum range at which a target can appear. Meanwhile the target storage sequencer 20 is locating applicable radar targets for the next radar sweep at the next azimuth angle and loading the corresponding return signal amplitudes into the other data stack in the appropriate range bins.

The concept of the video stack and the spatial relationship of the target range to the stack location makes the range resolution of the simulator a function only of the timing relationship between stack words or range bins and is not affected by the speed of any other circuitry. The speed of the surrounding electronic circuits determines only the target capacity of the system and even with moderately fast circuits (one microsecond switching speeds), a reasonably high capacity (200-300 targets) for the radar simulator is attainable. Thus, very fast highly accurate radar signals may be generated without an expensive, complex control system.

The standard beacon reply format (ATCRBS) requires a train of 0.45 us pulses spaced 1.45 us apart. These pulses contain altitude or identity information from the aircraft transponder. The ATCRBS video generator 12 builds the correct pulse train for a given interrogation mode using the same data stack register concept as is used for the radar echo.

When the target storage sequencer for the beacon channel locates a beacon word having azimuth limits which include the current azimuth, the amplitude data is placed in the range bin indicated by the fourth word of the beacon target. The amplitude of each pulse within the pulse train to be built is the same. The subsequent reply pulses after the first are placed every eight range bins apart throughout the entire pulse train. As shown in FIG. 4a, for a single beacon target, the amplitude 20 is loaded into the range bin No. 10 in the same manner as for a radar target. However, in addition to range bin 10, every eighth range bin starting with range bin 18 is loaded with the amplitude information if, and only if, the corresponding bit position in the transponder code (3/A in this example) is a "1". Each beacon target is represented in the data stack in the same manner. Its characteristic amplitude is given every eighth range bin if the corresponding code bit is a "1".

When the next beacon range zero trigger occurs, the data stack which has just been loaded is read out slightly faster and in exactly the same sequential manner as in the radar channel. For beacon simulation, the range bins are read out every 0.18125 us, which is exactly ⅛ of the standard ATCRBS interpulse period of 1.45 us. Since the timing is slightly faster, each range bin represents a slightly shorter distance (89.2 feet instead of 95 feet). This difference must be accounted for when composing the target list in the target memory 14 since the same distance target may have a slightly different range bin address for beacon than for radar. The read/write zero cycle begins with the beacon range zero trigger and continues through all of the range bin addresses in the ready data stack in the beacon channel and ends at a predetermined stack word address corresponding to the maximum range as in the radar channel. As the beacon data stack is read out, even if there is only one beacon target on board, a train of spaced pulses of identical amplitude spaced 1.45 us (or a multiple thereof) apart will be produced by the video data output control and D/A converter 28 and 30 on the beacon channel. To the target extractor electronics of the air traffic control system, this video output will look exactly like the reply from an aircraft at 892 feet in the example of FIG. 4a.

The target storage sequencer 20 in the beacon channel loads the beacon video data register stack for the next radar trigger in similar manner. For the next search radar target, the echoes do not change if the target configuration does not change. In contrast, for the beacon reply, the range zero trigger determines the mode of interrogation which can alternate. For example the mode can be 3/A for two triggers and then go to the C mode for one trigger then back to 3/A mode. Thus the type of data that must be sent in the transponder reply changes. The beacon video generator must anticipate the mode for the next trigger and build the stack accordingly. The target list, however, is unaffected. Fortunately, the sequence of modes (mode interlace) is fixed for any given ATCRBS. The beacon video generator records the mode interlace pattern, making it possible to predict the next mode given the previous mode sequence. The target storage sequencer in the beacon channel predicts the next mode and loads the stack with the proper data.

DESCRIPTION OF DETAILED EMBODIMENT

FIGS. 7-25 correspond to a specific prototype of the dual channel video generator system according to the invention. A functional block diagram level of description is presented in FIGS. 7 and 10-13, the individual blocks of which refer to FIGS. 14-25 depicting the corresponding electrical schematics. The schematics are furnished with conventional chip part designations. Pin numbers and values as well as clock signal frequencies and the like and are sufficiently complete to be understandable without detailed description. They are only referred to in the following description when necessary to illuminate the manner in which the function is implemented in the preferred embodiment, that is, where the implementation has functional significance.

The target memory 14 (FIG. 7) is a 32 kilobyte high speed array of sixteen 16K RAM's (Fujitsu 8167-70) commonly addressed by the 14 bit parallel address bus $MA_{0-13}$. The memory 14 has 16 bits of parallel input and output labelled DI and DO and a pair of control lines MCS (memory select) and MWE (memory write enable). The target memory 14 can be accessed by three different entities the 990/5 (16 in FIG. 1) via the TI-LINE (an asynchronous data bus with 16 bits of data, 20 bits of address, 5 or 6 bits of control), the beacon video generator target storage sequencer and the radar video generator target storage sequencer. Triple access priority resolver 40 determines which one of these entities has access to the target memory at a given time. The CPU has access to the memory via the TILINE interface 42 for the purpose of loading target words into the memory 14 while the video generators require access whenever a range zero trigger occurs to retrieve valid targets to load into the data stacks. Access conflicts are resolved by the triple access priority resolver which receives radar data requests RDRQ, beacon data requests BDRQ and TILINE data requests TLDRQ and gives the "go ahead" to one of them via an acknowledge line such as radar RDAK.

The priority resolver 40 (FIG. 7) handles access requests in the following manner. Since the radar and beacon amplitude data must be loaded into the corresponding data stacks before the next range zero trigger, the radar data and beacon data requests are given higher priority than the TILINE data request. Since there is always more radar data to insert than beacon data because of nonaircraft "targets" such as ground clutter, the radar data request is given priority over the beacon data request.

Figure 9:
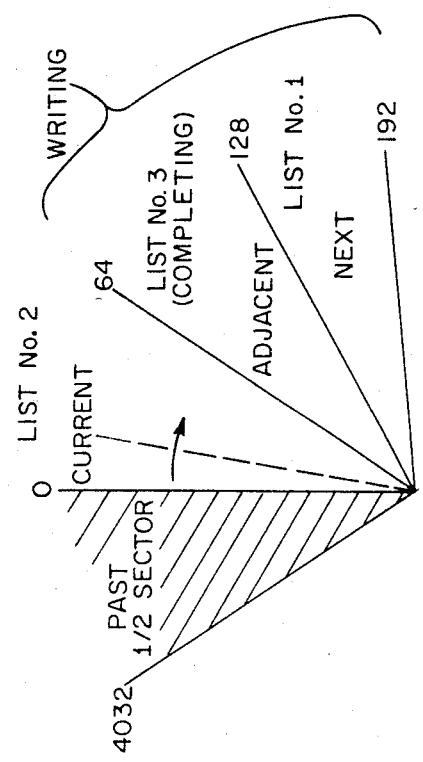
FIG. 9 is a schematic representation of the halfsector loading cycle for the target lists.
Figure 8:
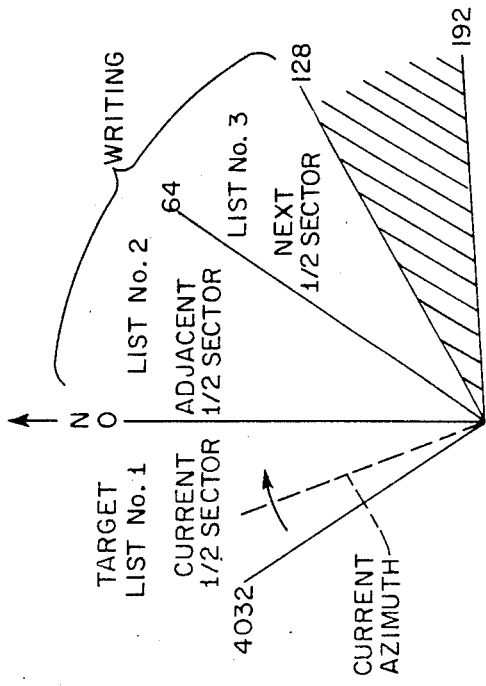
FIG. 8 is a memory map of the locations of the beacon and radar target word lists.
Figure 10:
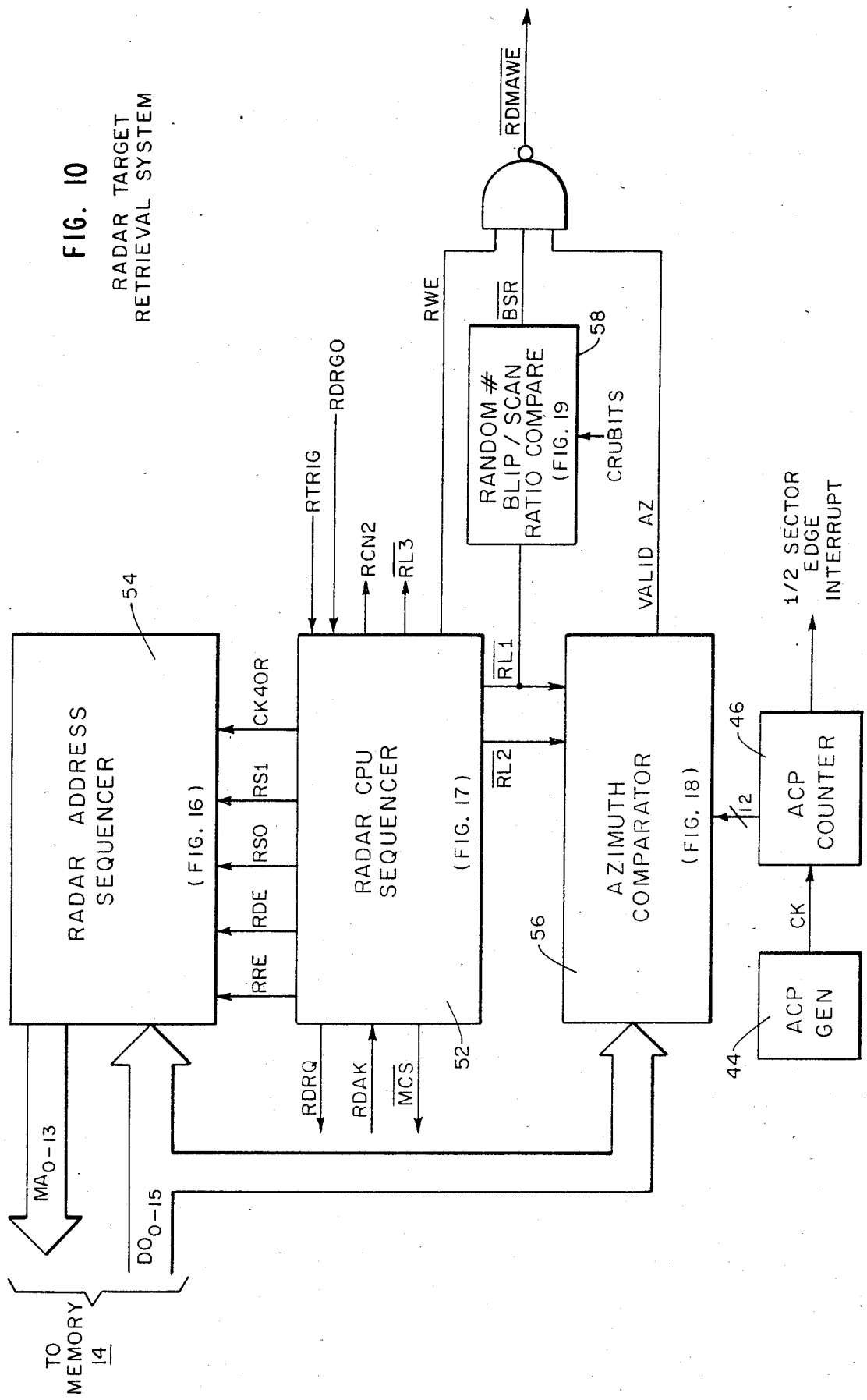
FIG. 10 is a block diagram of the radar target retrieval system.

Target memory 14 contains two separate sections for beacon and radar targets as shown in the memory map in FIG. 8. The beacon target section is in three parts each containing 1200 words. The target data for a complete 360° scan is not loaded at the same time. Instead, because of the relatively slow motion of the antenna, it is possible and indeed desirable to limit the target data to a small localized azimuth range. In radar terminology, one sector is 11.25°. It has been found highly desirable to limit the target words to be searched by the video generator on a given range zero trigger to one-half sector or 5.625°. This divides the 360° circle into 64 half sectors each composed conveniently of 64 ACP's. The ACP clock signal can be produced internally or derived externally from a rotating antenna. As shown in FIG. 10, the ACP generator or clock signal source 44 clocks an ACP counter 46 which produces a 12 bit parallel azimuth output representing the current azimuth of the antenna and a half sector start signal every 64 ACP's, starting with zero or 4,096 which usually represents the reference direction north. As shown in FIG. 9, the half sector including the current simulated azimuth is defined as the "current half sector". This is the half sector for which the target information, if any, for beacon and radar targets has already been stored in the corresponding list sections of the memory. When the current azimuth (same for radar and beacon) crossed the ACP "boundary line" 4,032 of the current half sector, the half sector edge signal occurred. This signal is used as an "interrupt" in the software associated with the CPU 16 to call a target load routine which clears the past half sector and writes targets into the adjacent half sector from zero to 64 and then, starts writing targets in the next half sector from 64 to 128. Accordingly, in FIG. 9, as the antenna azimuth swings past north, the half sector information for the last half sector 4,032 to 4,096 is cleared and for retrieval, the address of the target data for the new current half sector from zero to 64 is substituted. Meanwhile, prompted by the half sector edge interrupt, the CPU completes writing the target data for sector 64-128 and continues to write target data for the next half sector 128-192 in the list area vacated by the clearing of the past half sector target data. Thus at any given time the target memory 14 contains not only the target data for the current half sector but the target data for the adjacent approaching half sector, and the CPU is working on the next half sector beyond the approaching one.

In addition to the TILINE interface 42, FIG. 7 shows CRU address decode and CRU bit decode units 46, 48 and 50. CRU refers to the TMS 9900 microprocessor command driven I/O interface known as the communications register unit. The CRU provides 4,096 directly addressable input bits and 4,096 directly addressable output bits for interfacing the microprocessor and parameter registers. The specific outputs of the CRU address decode and CRU bit decode units are used to control or convey data and timing pulses to various devices in the detailed schematics FIGS. 14-25. For example, the blip/scan ratio established by the scenario generator system (not shown) is taken off of the CRU bus.

Figure 11:
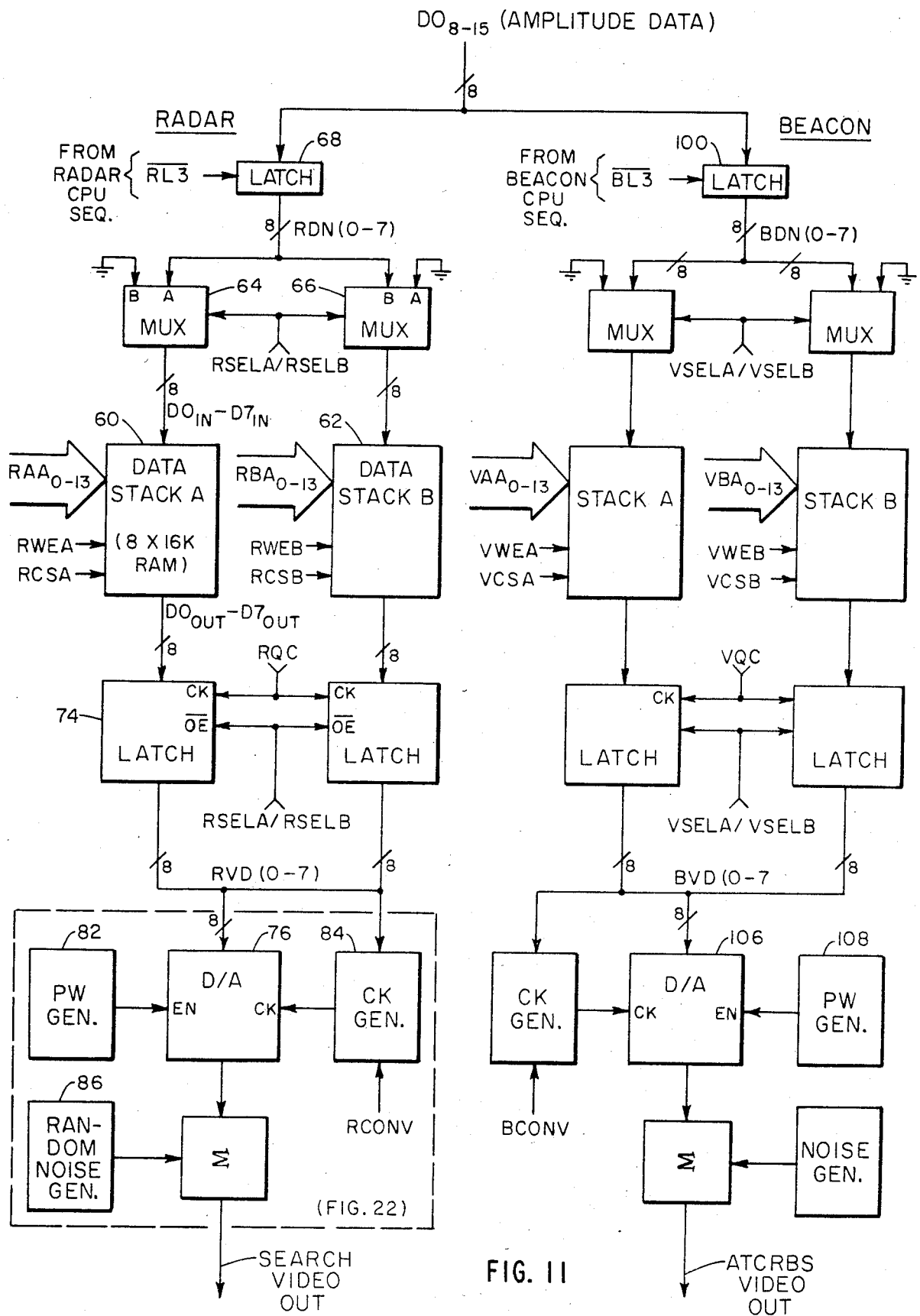
FIG. 11 is a block diagram of the video data stack system for both channels.

FIGS. 10 and 11 show the separate radar and beacon target retrieval systems, respectively. There are more similarities than differences between them.

Figure 16:
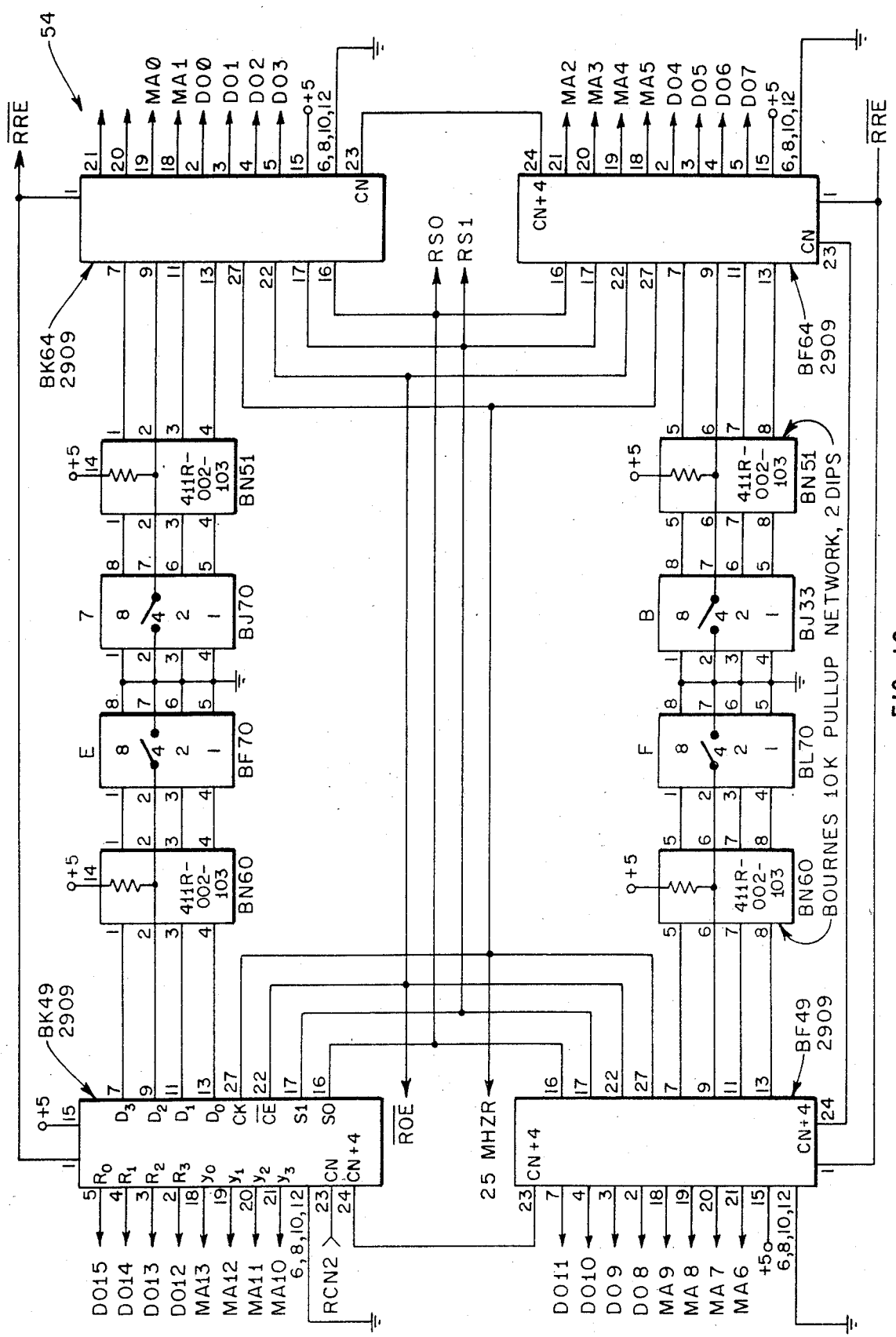
FIG. 16 is a schematic diagram of the radar address sequencer.
Figure 18:
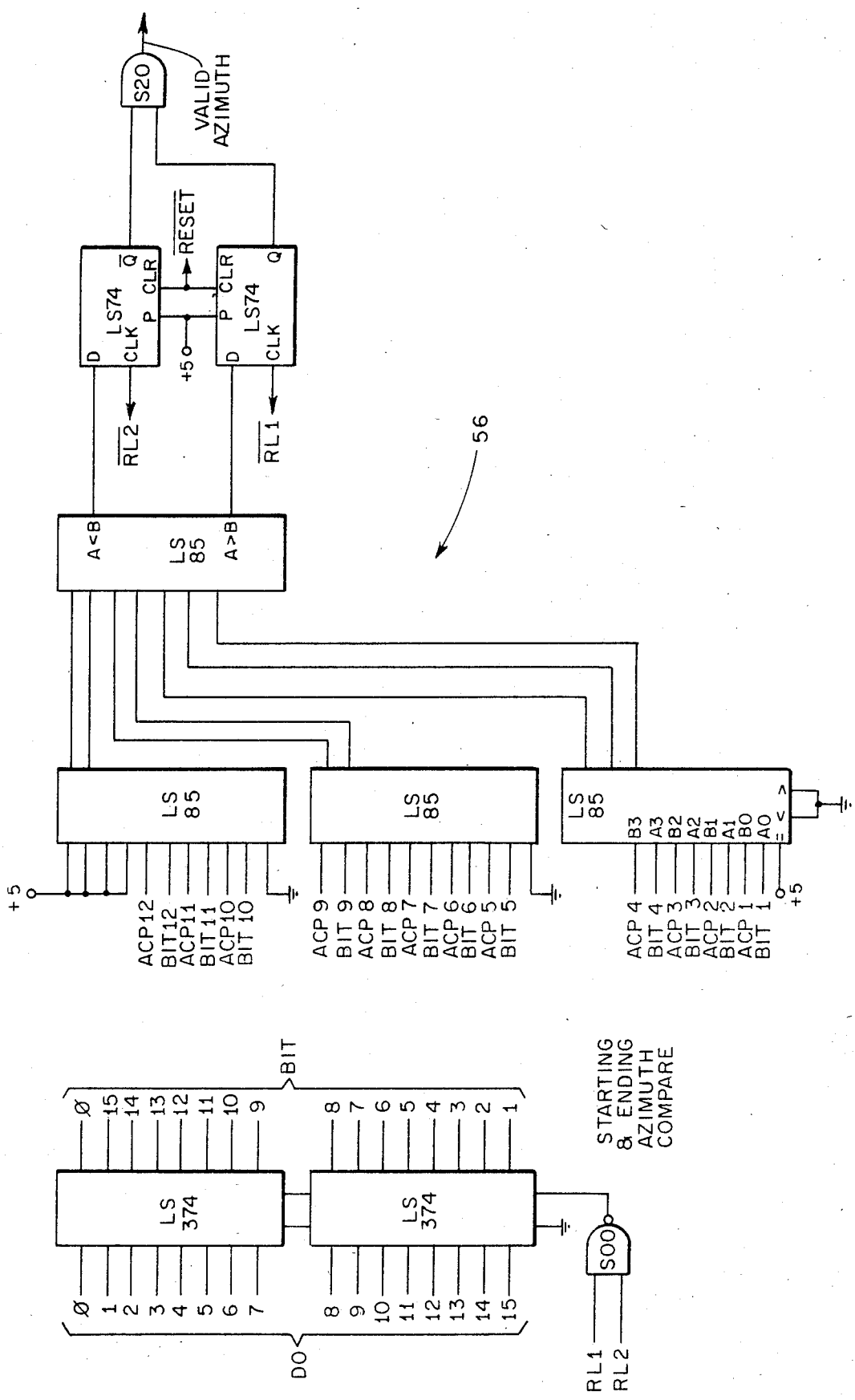
FIG. 18 is a schematic diagram of the azimuth comparator.
Figure 19:
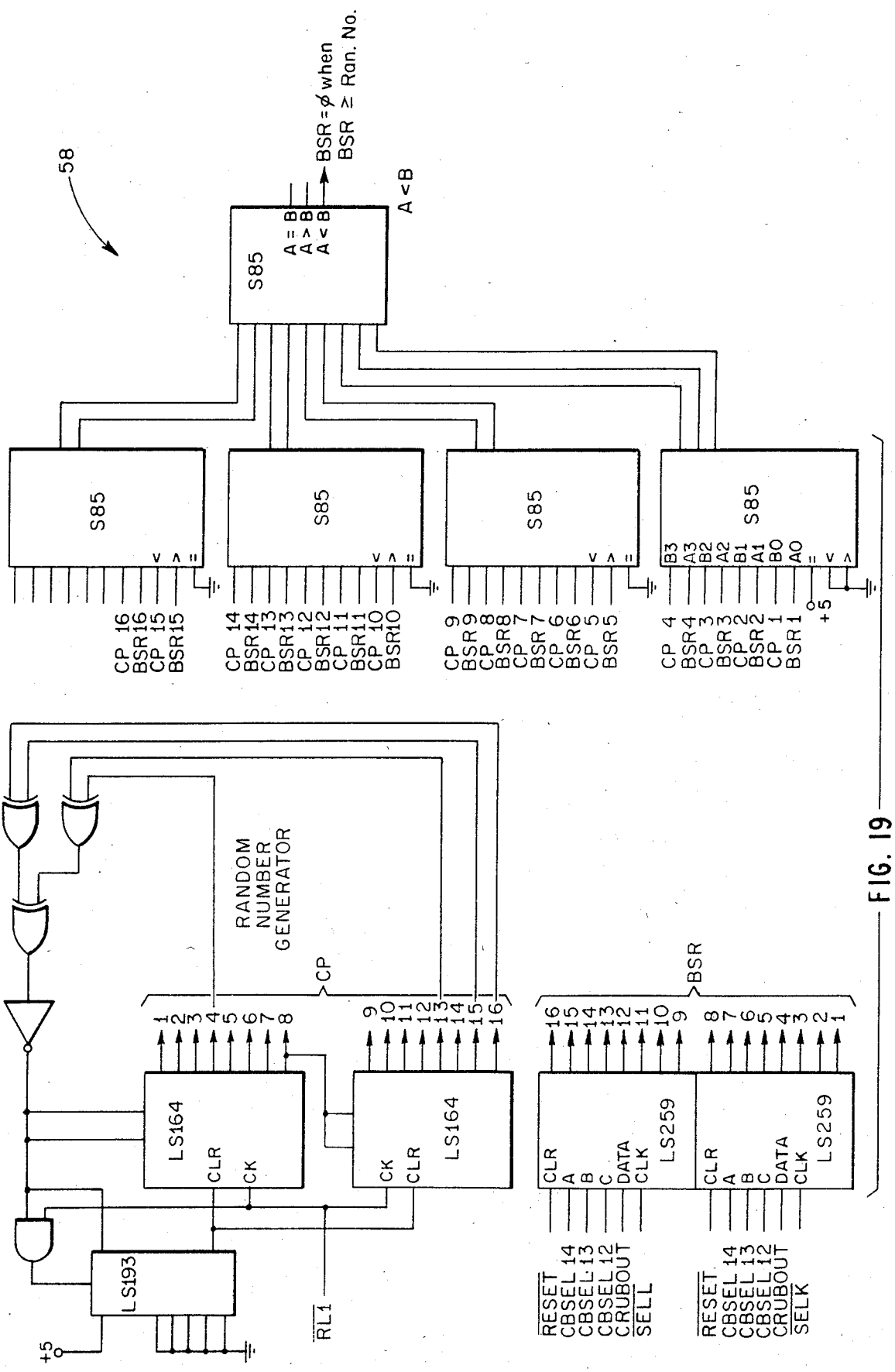
FIG. 19 is a schematic diagram of the blip scan ratio circuit.

The radar target retrieval system shown in more detail in FIGS. 16-18 accesses the target memory 14 and reads through all of the radar targets comparing the starting and ending azimuth with the current simulated azimuth and loading the stack as indicated. The radar CPU sequencer 52 controls the operation. Upon receiving a radar trigger signal RTRIG and being clocked by the radar go signal RDRGO, the CPU sequencer puts in a radar data request to the priority resolver 40 (FIG. 7), which, when acknowledged through line RDAK, results in the memory control select (MCS) signal taking charge of the memory array 14 in FIG. 7. As shown in FIG. 17, the radar CPU sequencer is composed of an embedded microprocessor system having its own read only memory (ROM) designated "fiver" and "eight". The ROM contents expressed in hexadecimal code are found in Appendices I and II. The microprocessor is a bit slice microprocessor which produces a series of output signals to the radar address sequencer 54 shown in more detail in FIG. 16. The address sequencer 54 is also composed of bit slice microprocessors with switches included to indicate the beginning address of the target list. The address sequencer 54 runs through the applicable radar target list addresses. At each target the azimuth comparator 56 shown in FIG. 18 compares the output of the starting and ending azimuth with the current azimuth and if the current azimuth is higher than the targets starting azimuth and lower than its ending azimuth, the comparator 56 issues a signal indicating that the present target is valid. Simultaneously the radar CPU sequencer 52 enables a random number blip/scan ratio comparator circuit 58 shown in FIG. 19. This circuit produces an output indicative of whether the blip scan ratio preestablished for the unit being simulated is greater than a continually changing random number. If it is, when the radar write enable (RWE) signal is produced by the sequencer 52, the output (RDMAWE)-bar is generated by the retrieval circuitry of FIG. 10 which initiates access to the data stacks.

Figure 12:
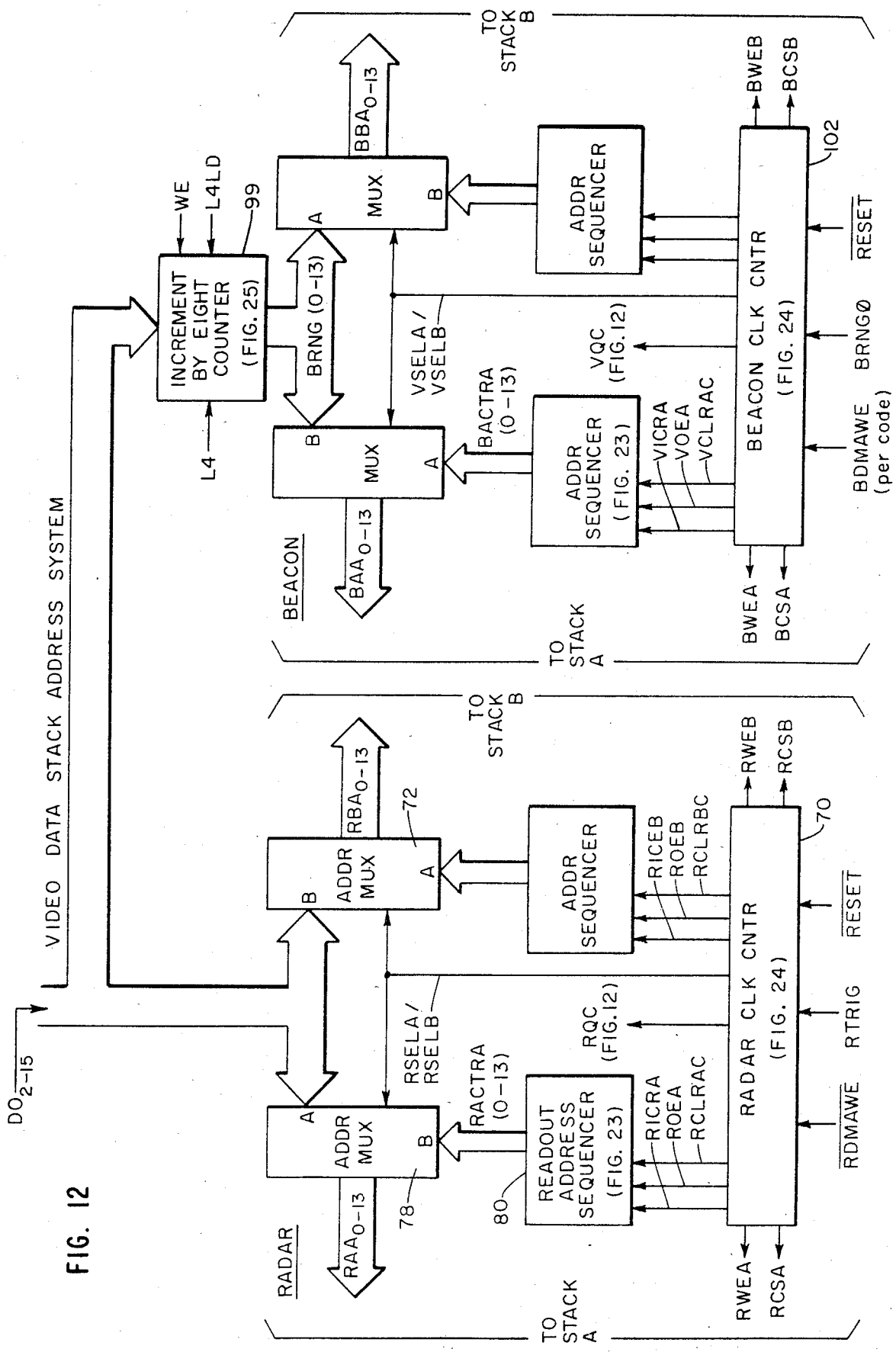
FIG. 12 is a block diagram of the video data stack address system for both channels.

The radar data stack shown in the left hand side of FIG. 11 includes two separate data stacks 60 and 62 designated stack A and stack B. Data stack A is composed of eight high speed static 16K RAM's (preferably Fujitsu 8167-70) with access times on the order of 70 nanoseconds. Except that there are half as many, each data stack RAM array is exactly like that in target memory 14. There are separate addressing control lines for each data stack as shown. Multiplexers 64 and 66 alternate the inputs to stacks A and B between ground and the 8-bit data signals RDN0 to RDN7 provided by latch 68 which is connected to target memory output data bits 8 through 15 as shown. The radar clock counter circuit 70 in FIG. 12 produces the multiplexer control signal (RSELA)-bar/SELB in conjunction with the write enable and memory select signals for stack A or stack B. If stack B is the "inactive stack", the amplitude data, obtained by the radar address sequencer 54 addressing the third word in the valid radar target, is latched by timing signal (RL3)-bar from the radar CPU sequencer 52 (FIG. 10) and the eight amplitude bits are fed via MUX 66 to the parallel data input lines of the RAM array in stack B. Meanwhile the radar address sequencer 54 has addressed the fourth word in the valid target to obtain the range information which is placed on the data bus and passed to the parallel memory address lines RBA$_{0-13}$ for stack B via the address multiplexer 72 (FIG. 12). The write enable signal RWEB produced by the radar clock counter 70 (FIG. 12) loads the amplitude data into stack B whereupon the target storage sequencers 52 and 54 resume the search for additional valid radar targets.

Meanwhile stack A is being read out. The (RSELA)-bar control line disables (grounds) the input to stack A and the complement enables latch 74 (FIG. 11) which passes the eight bit output of the data stack A to a digital to analog (D/A) converter 76 while the stack addresses are sequenced. As shown in FIG. 12, the address multiplexer 78 for stack A selects the readout address sequencer 80 while issuing the memory select signal RCSA to read out each bin starting with range bin zero in sequence. The digital to analog converter 76 is enabled by an adjustable pulsewidth generator 82 (FIG. 11) and clocked by a clock generator 84 triggered by the latch output to produce a timed video pulse analog output which is summed with the output of a random noise generator 86 to produce the search video output. (See FIG. 22 for details.) Note that control of the active stack, stack A, is independent of the target memory so that the radar address sequencer 54 (FIG. 10) can service the other stack at the same time.

Figure 13:
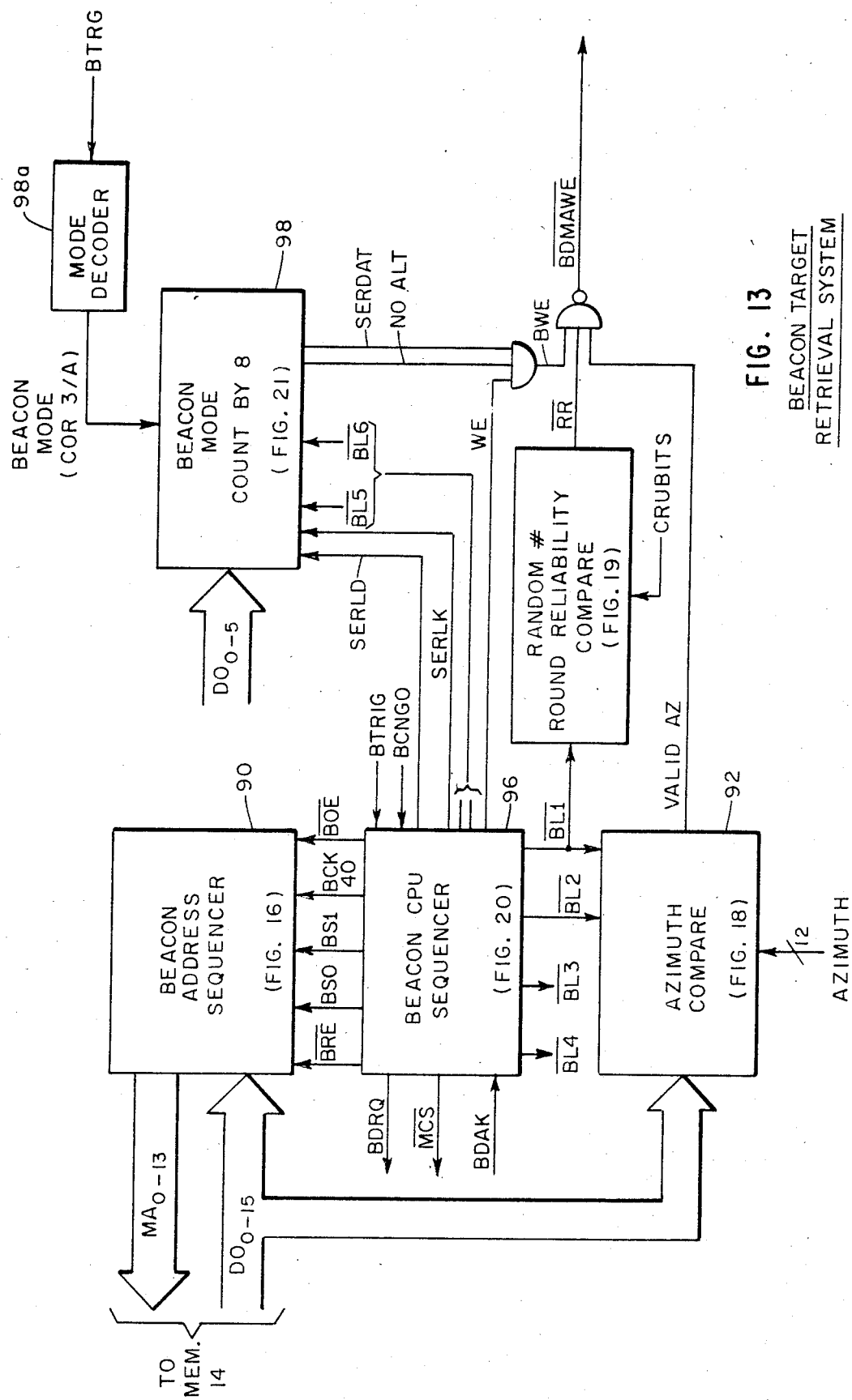
FIG. 13 is a block diagram of the beacon target retrieval system.
Figure 14:
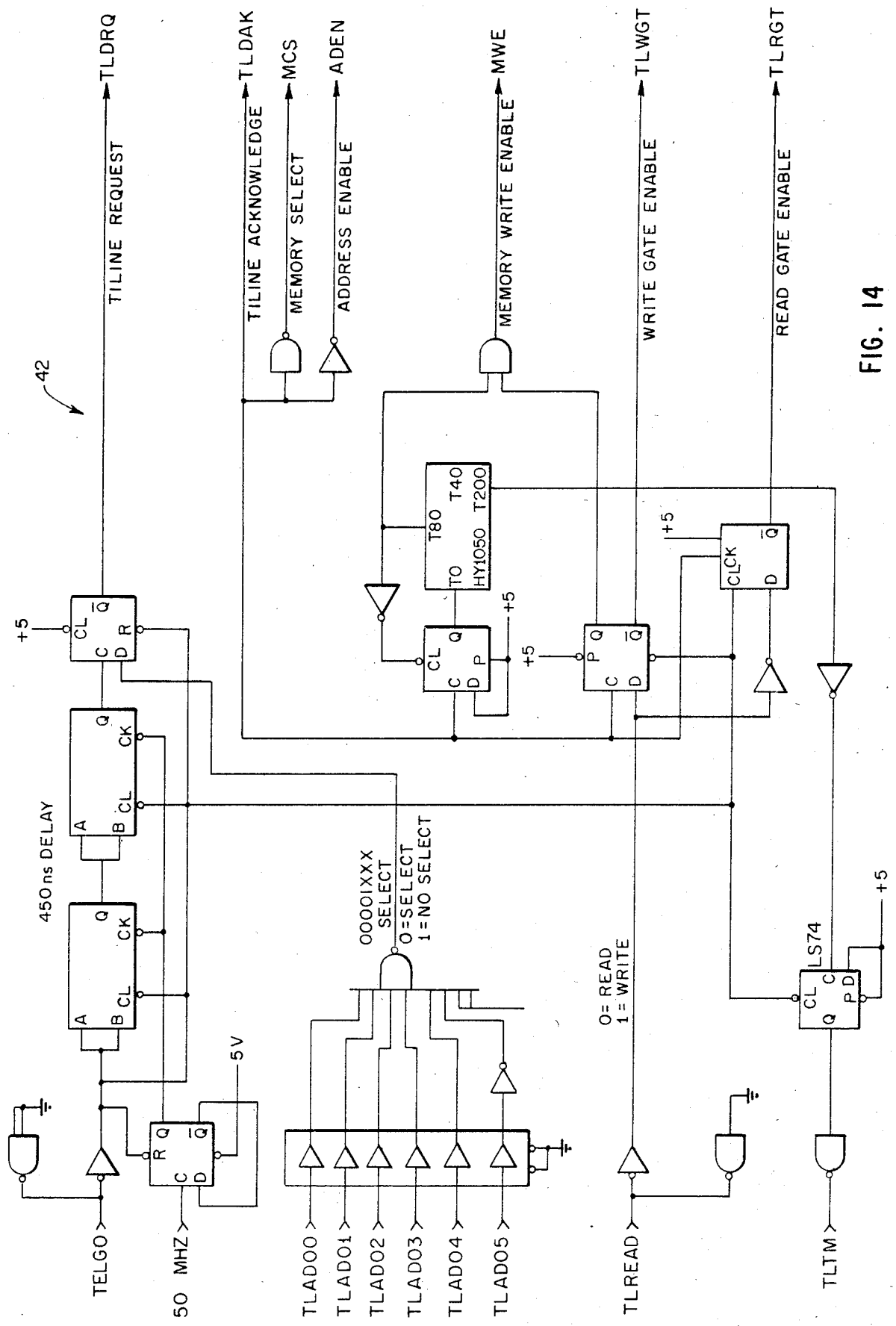
FIG. 14 is an electrical schematic diagram of the TILINE interface.
Figure 15:
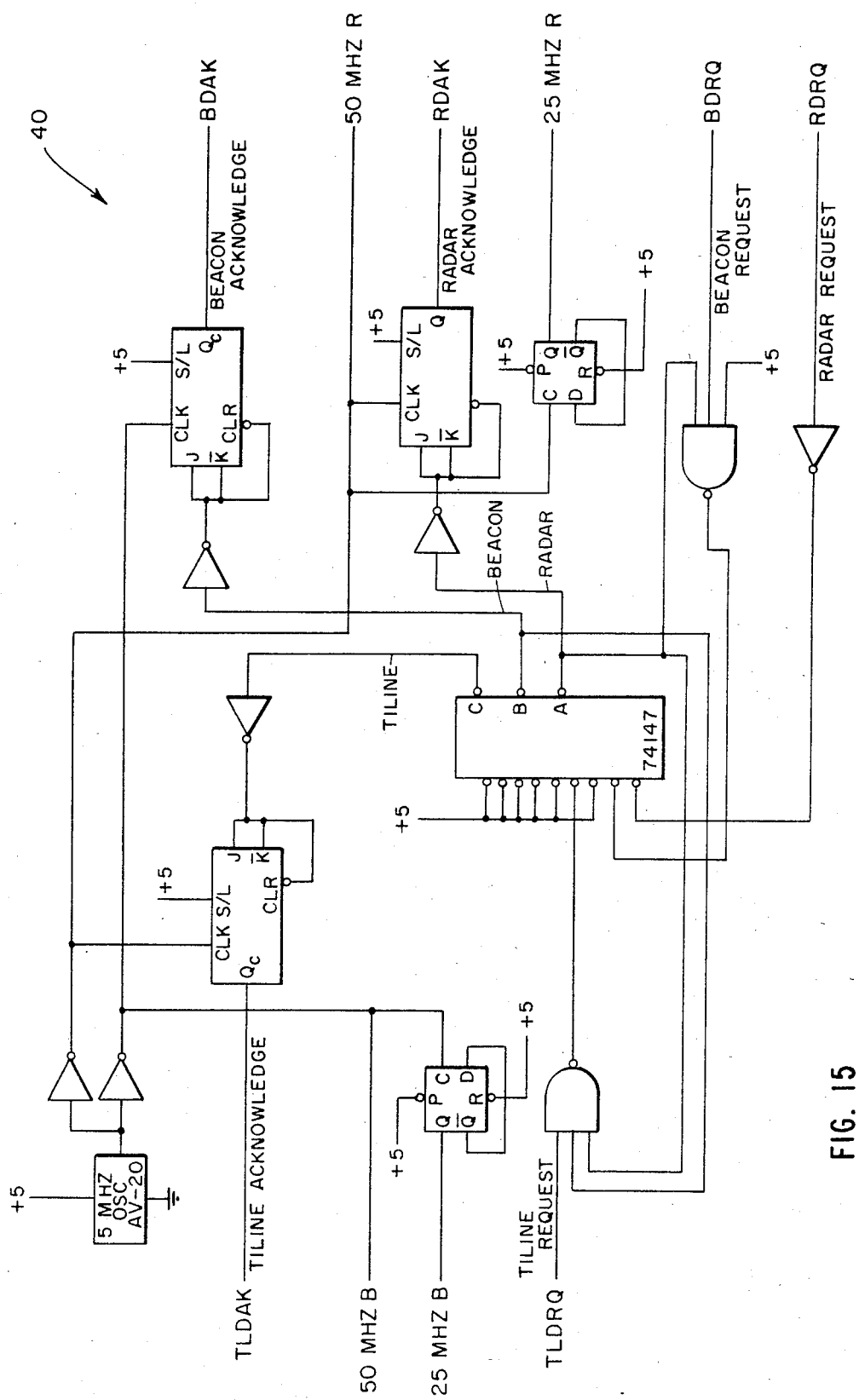
FIG. 15 is a schematic diagram of the triple access priority resolver.

The beacon channel operation differs in several respects. The configurations of the address sequencer 90, azimuth comparator 92 and random number/round reliability figure comparator 94 in the beacon target retrieval system of FIG. 13 are similar to (although separate from) those for the radar channel shown in FIGS. 16, 18 and 19. The beacon CPU sequencer 96 is different and the detailed schematic is shown in FIG. 20. In the same manner as the radar CPU sequencer, the beacon CPU sequencer obtains access to the target memory 14 (FIG. 7) and sequences through the beacon target addresses according to a stored "program" in ROM's BEC-IA, IIA, IB, IIB, IC and IIC. The contents of these ROM's expressed in hexadecimal code are found in Appendices III–VIII, respectively. For each beacon target in memory, the azimuth is compared in the same manner as for the radar target. The main difference between the beacon and radar target retrieval system is that in the beacon system the write enable signal WE from the sequencer 96 (FIG. 13) is gated by the serialized code produced by beacon mode count-by-eight circuit 98. Thus the resulting DMA signal to access the inactive data stack is modulated by the serial converted code. Mode C or 3/A is selected by means of mode decoder 98a responsive to the beacon range zero trigger (P3). The mode decoder is thus clocked through a predetermined interrogation pattern, such as one 3/A, two C's, one 3/A and so on. Each time, both code words of the target are presented to the circuit 98, and one of them, according to the current mode, is serialized. In the case of a C mode interrogation for a target without an encoding altimeter, the NO ALT signal is low, thus gating off the DMA signal altogether.

As shown in FIG. 12, the data bus for the output of the target memory 14 containing the range bin address is passed to the inactive data stack via an increment-by-eight counter 99 which is clocked by the ungated WE signal from the beacon CPU sequencer 96 (FIG. 13). Thus the original range-bin address is incremented sequentially by eight, while the gated write enable signal (BDMAWE)-bar modulates the write enable signal for the inactive stack to cause the amplitude data held in the beacon latch 100 (FIG. 11) to be inserted in every eighth range bin starting with the one after the designated range bin in accordance with the binary condition of the serialized code. The beacon range zero signal which comes over the CRU bus causes the stacks to be interchanged and the previously loaded stack to be read out.

Figure 24:
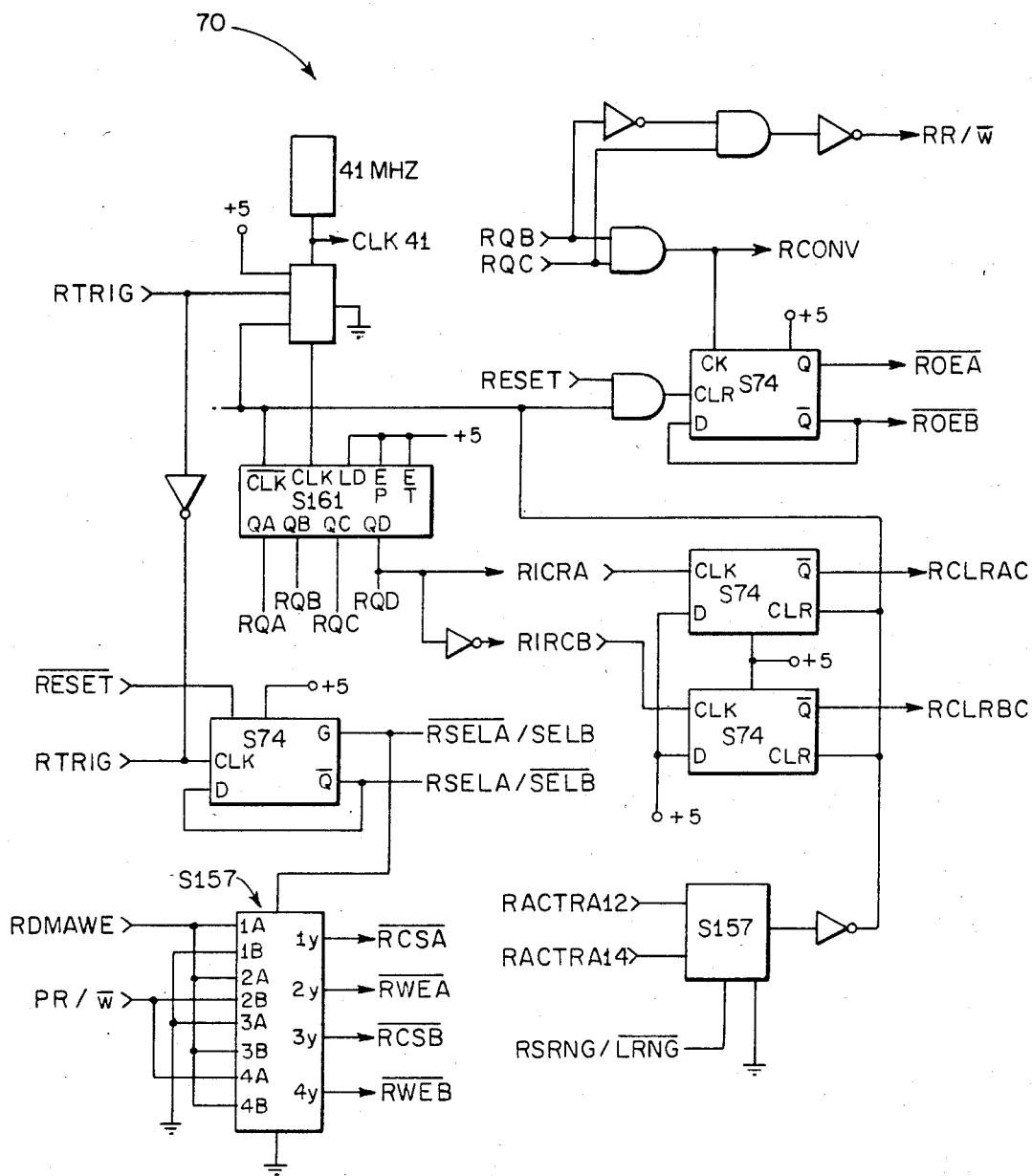
FIG. 24 is a schematic diagram of the radar clock-/counter control circuit.
Figure 25:
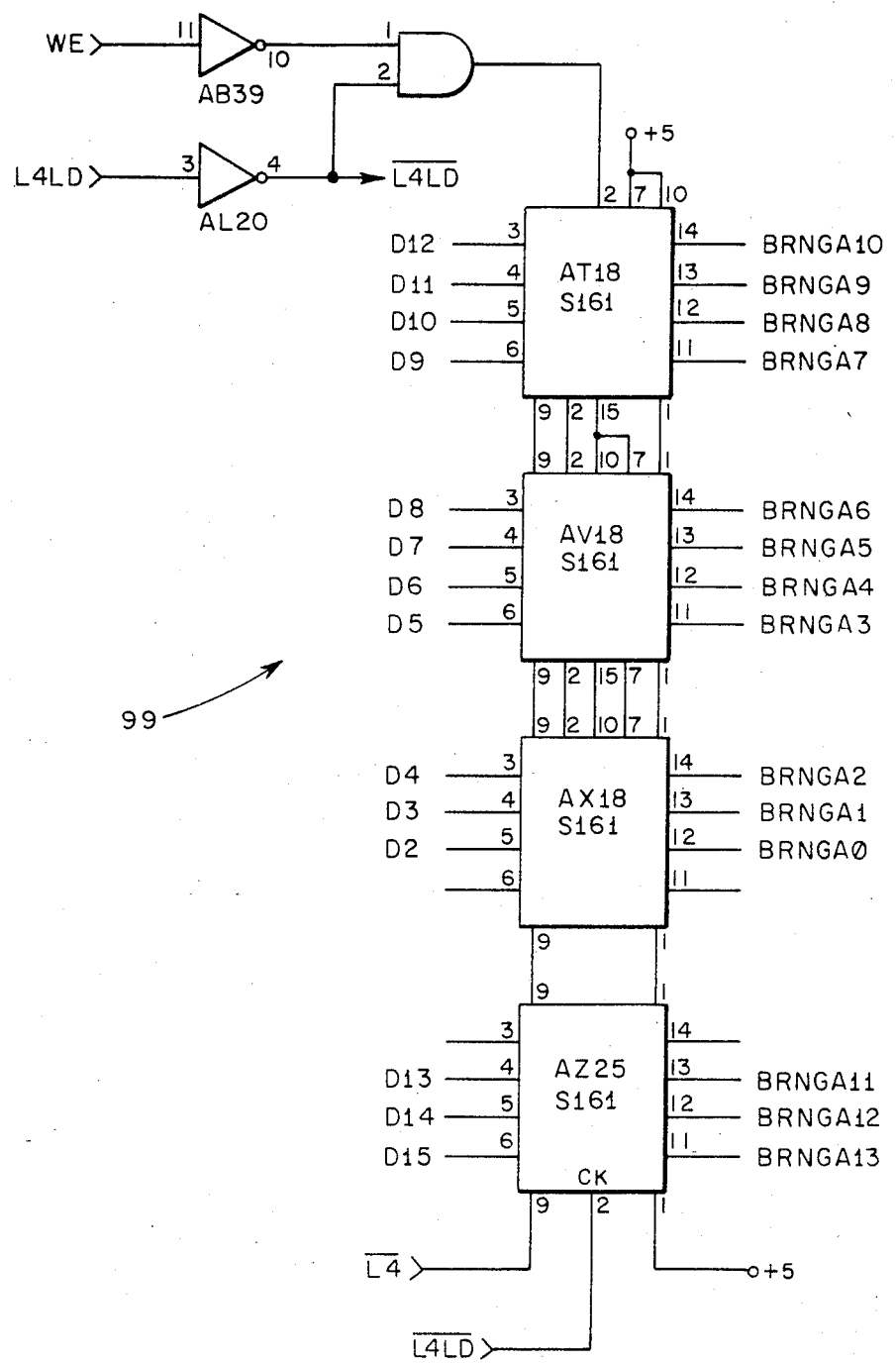
FIG. 25 is a schematic diagram of the beacon data input address increment-by-eight circuit.

The only difference between the beacon clock counter 102 (FIG. 12) and the radar clock counter 70 is the clock frequency. As shown in FIG. 24, the radar clock frequency is 41.45 MHz. For the beacon clock counter control circuit, the circuitry is the same except that the clock input is 44.138 MHz. Thus when reading out the ready or active data stack, the addresses are sequenced at the higher beacon rate of 0.18125 us. The output of the active beacon data stack is fed in a similar manner to a D/A converter 106 enabled by fixed pulse-width (0.45 us-standard for ATCRBS) generator 108 and clocked by a similar clock generator to issue a video signal which is summed with random noise to produce the ATCRBS video output signal.

The preferred embodiment described above achieves an accuracy and resolution in range, azimuth and altitude far beyond prior art systems. It allows targets to be positioned with extreme accuracy while allowing exceptionally high capacity. The capacity and accuracy goals attained with this design are not met by any commercial video level simulator currently available. The heart of the video generator is the precisely clocked high speed, high capacity random access memory and the dual stack, read/clear operation. The use of the same circuitry for beacon simulation by incrementing the range address and modulating the amplitude data with the serialized code is another unique departure from prior art systems which enables the presentation of simulated video of overlapping transponder replies from closely spaced aircraft. The starting and ending azimuth and half sector update system for the target storage memory allows an optimum quantity of target data storage to be screened on a localized azimuth basis. The system allows an air traffic control system to be tested to the limits under overload conditions. Use of this invention will insure that serious deficiencies in air traffic control systems are detected before an unsafe condition occurs.

The foregoing description is intended to be illustrative of a specific implementation. Many variations and additions or modifications to this implementation are, of course, possible without departing from the spirit or scope of the invention as indicated by the appended claims.

What is claimed is:

1. An air traffic video simulator for producing a video signal output with simulated targets, comprising:
    clock means for generating an azimuth signal indicative of the current azimuth of a rotating antenna,
    target register means for storing a list of target words each including starting and ending azimuth, range and amplitude data for a designated target within the current one of a plurality of predetermined azimuth sectors,
    at least one data stack register means providing a plurality of separately loadable range bins corresponding to progressively farther designated ranges,
    means with access to said target register means and azimuth signal for finding in said list each target word whose starting and ending azimuth includes the current azimuth and for entering the amplitude data for each such target word in the data stack range bin whose range designation corresponds to the range data of the target word,
    means for reading out the contents of said data stack register means bin-by-bin in sequence according to their progressively increasing designated ranges at a clock rate related to the interval between said designated ranges, and
    video converter means for producing a video signal output related to the output of said data stack register means to simulate the target return signals at the current azimuth.

2. The simulator of claim 1, further comprising:
    another data stack register means interchangeable with said one data stack register means, and
    means for alternating said two data stack register means such that one is available for loading while the other one is being read out.

3. The simulator of claim 1, further comprising:
    means for generating a simulated range zero trigger,
    said reading means having means for initiating reading out of said data stack register means in timed response to said range zero trigger.

4. The simulator of claim 1, further comprising:
    means responsive to said azimuth signal for issuing a sector start signal,
    means responsive to said sector start signal for loading the target list for the next adjacent sector into said target register means.

5. The simulator of claim 1, further comprising:
    clearing means responsive to said clock rate for restoring the contents of each range bin bin-by-bin to a known reference state immediately after its contents are read out.

6. An air traffic beacon video simulator for producing video output signals simulating transponder returns, comprising:
    means for generating an azimuth signal indicative of the current azimuth of a rotating beacon,
    target register means for storing a list of target words each including starting and ending azimuth, range, amplitude and a multibit transponder supplied data word for each target within the current one of a plurality of predetermined azimuth sectors,
    at least one beacon data stack register means providing a plurality of separately loadable multibit range bins corresponding to progressively farther designated ranges,
    search/load means with access to said target register means and azimuth signal for finding in said list each target word whose starting and ending azimuth includes the current azimuth and entering the amplitude data for the target word in a first data stack range bin whose range designation corresponds to the range data of the target word and for entering the same amplitude data in every said Nth range bin after the first for which a corresponding bit of the data word is a "1",
    means for reading the contents of the data stack register means out bin-by-bin in sequence according to their progressively increasing designated ranges at a clock rate related to the interval between said designated ranges, and
    video converter means for producing a video output signal pulse having an amplitude related to the output of sequential range bins from said data stack register means to simulate transponder replies at the current azimuth.

7. The beacon simulator of claim 6, further comprising:
    means for generating a beacon range zero trigger,
    said reading out means initiating the output of said data stack register in timed response to said range zero trigger.

8. The beacon simulator of claim 7, further comprising:

interrogation mode decoder means responsive to said range zero trigger for producing a mode control output, and said search/load means being responsive to said mode control signal for obtaining one or another portion of said target supplied data word and loading it into the corresponding range bins.

9. An air traffic radar/beacon video simulator, comprising:
digital target memory means for storing radar and beacon target data,
first digital register means for receiving and reading out radar data,
second digital register means for receiving and reading out beacon data,
means for retrieving and loading radar and beacon data from said target memory means corresponding to a given azimuth into said first and second register means respectively,
means responsive to a radar trigger signal for sequentially reading out said first register at a first clock rate to produce digital output representing radar return signals,
means responsive to a beacon trigger signal for sequentially reading out said second register means at a second clock rate to produce a digital output representing beacon replies, and
means connected to receive said digital outputs for producing analog video output signals in accordance therewith.

10. The simulator of claim 9, wherein said registers are identical.

11. The simulator of claim 9, wherein said first and second clock rates are different.

12. The simulator of claim 9, wherein said radar and beacon target data is listed in separately addressable portions of said target memory means.

13. An air traffic radar/beacon video simulator, comprising:
means for generating a current azimuth signal indicative of the azimuth of a rotating antenna,
target memory means for storing a list of target words each including starting and ending azimuth, range and amplitude data for a designated target within a current one of a plurality of predetermined azimuth sectors,
means responsive to said azimuth signal for retrieving data from said target memory means for each target having starting and ending azimuth including the current azimuth, and
means responsive to the output of said retrieving means for producing a video signal output in accordance with the retrieved target data for the current azimuth.

14. The simulator of claim 13, wherein said target words include radar targets and beacon targets, said beacon targets having in addition transponder code data, said video producing means including means for generating a simulated beacon reply in accordance with the retrieved beacon target data.

15. The simulator of claim 14, wherein said radar target data and beacon target data are listed in separately addressable portions of said memory means.

16. An air traffic video simulator for producing a video signal output with simulated targets, comprising:
clock means for generating an azimuth signal indicative of the current azimuth of a rotating antenna,
target register means for storing a list of target words each including azimuth, range and amplitude data for a designated target,
two interchangeable data stack register means each providing a plurality of separately loadable multi bit range bins corresponding to progressively farther designated ranges covering the entire geographic range,
means with access to said target register means and azimuth signal for finding in said list each target word whose azimuth corresponds to the current azimuth and for entering the amplitude data for each such target word in the data stack range bin of one of said data stack register means, the range designation of said range bin corresponding to the range data of the target word,
means for reading out the contents of said one data stack register means bin-by-bin in sequence according to their progressively increasing designated ranges at a clock rate related to the interval between said designated ranges,
video converter means for producing a video signal output related to the output of said data stack register means to simulate the target return signals at the current azimuth, and
means for alternating said two data stack register means such that one is available for loading while the other one is being read out.

17. The simulator of claim 16, further comprising:
clearing means responsive to said clock rate for restoring the contents of each range bin bin-by-bin to a known reference state immediately after its contents are read out.

18. The simulator of claim 16, wherein said video converter means has means for producing an output pulse width is independent of the location of said range bin in said data stack register means.

19. The simulator of claim 18, wherein said video converter means includes a retriggerable counter.

* * * * *

UNITED STATES PATENT AND TRADEMARK OFFICE
CERTIFICATE OF CORRECTION

PATENT NO. : 4,591,858
DATED : May 27, 1986
INVENTOR(S) : Stephen R. Jacobson

It is certified that error appears in the above-identified patent and that said Letters Patent is hereby corrected as shown below:

Column 4, line 39, "utilized" should be --utilize--;

Column 5, line 5, "bits" should be --bit--;

Column 5, line 30, "codes" should be --code--;

Column 7, line 7, "fnterrogation" should be --interrogation--;

Column 7, line 57, "ready" should be --read--;

Column 7, line 61, "range trigger" should be --range zero trigger--.

Signed and Sealed this

Eighth Day of September, 1987

Attest:

DONALD J. QUIGG

Attesting Officer

Commissioner of Patents and Trademarks